(12) United States Patent
Toda et al.

(10) Patent No.: US 6,388,689 B1
(45) Date of Patent: May 14, 2002

(54) SCANNING EXPOSURE UNIT, SEMICONDUCTOR LASER DRIVING CIRCUIT AND IMAGE FORMING APPARATUS

(75) Inventors: Tsuneo Toda; Masaki Suto, both of Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/629,436

(22) Filed: Jul. 31, 2000

(30) Foreign Application Priority Data

Sep. 29, 1999 (JP) ............................................. 11-276689

(51) Int. Cl.⁷ .......................... B41J 2/385; G03G 13/04
(52) U.S. Cl. ....................................... 347/132; 347/247
(58) Field of Search ................................. 347/118, 129, 347/130, 131, 132, 133, 135, 225, 237, 238, 247, 252, 253

(56) References Cited

U.S. PATENT DOCUMENTS

| | | | |
|---|---|---|---|
| 4,682,876 A | * | 7/1987 | Ohtsuka et al. .............. 347/132 |
| 4,864,216 A | * | 9/1989 | Kalata et al. ............ 347/237 X |
| 4,989,039 A | * | 1/1991 | Hayashi et al. ......... 347/133 X |
| 5,818,489 A | * | 10/1998 | Yoshinaga et al. ........... 347/131 |
| 6,160,568 A | * | 12/2000 | Brodsky et al. ............. 347/247 |
| 6,169,563 B1 | * | 1/2001 | Doi ......................... 347/237 X |
| 6,191,804 B1 | * | 2/2001 | Kitagawa et al. ....... 347/238 X |

FOREIGN PATENT DOCUMENTS

| | | |
|---|---|---|
| JP | 1-205183 | 8/1989 |
| JP | 1-206366 | 8/1989 |
| JP | 3-2878 | 1/1991 |

* cited by examiner

*Primary Examiner*—Sandra Brase
(74) *Attorney, Agent, or Firm*—Morgan, Lewis & Bockius LLP

(57) ABSTRACT

The formation of a high-quality image at a resolution at which a dot size is smaller than the diameter of a laser beam is attained at a low cost. When an exposure operation is carried out by increasing an optical intensity of a laser beam to a level higher than that of a steady-state optical intensity thereof by utilizing a difference, which is ascribed to an exposure rate of a photosensitive body, in the condition of a latent image formed, the depth and width of a latent image, which were small in all related art cases, can be increased to high levels. Therefore, overshoot is generated at the LD lighting starting time to increase the optical intensity at a rising edge of the laser beam to a level higher than that of a steady-state optical intensity thereof, whereby a height to width ratio and the reproducibility of one dot and a halftone in a case where the resolution is smaller than the diameter of the laser beam can be improved.

10 Claims, 20 Drawing Sheets

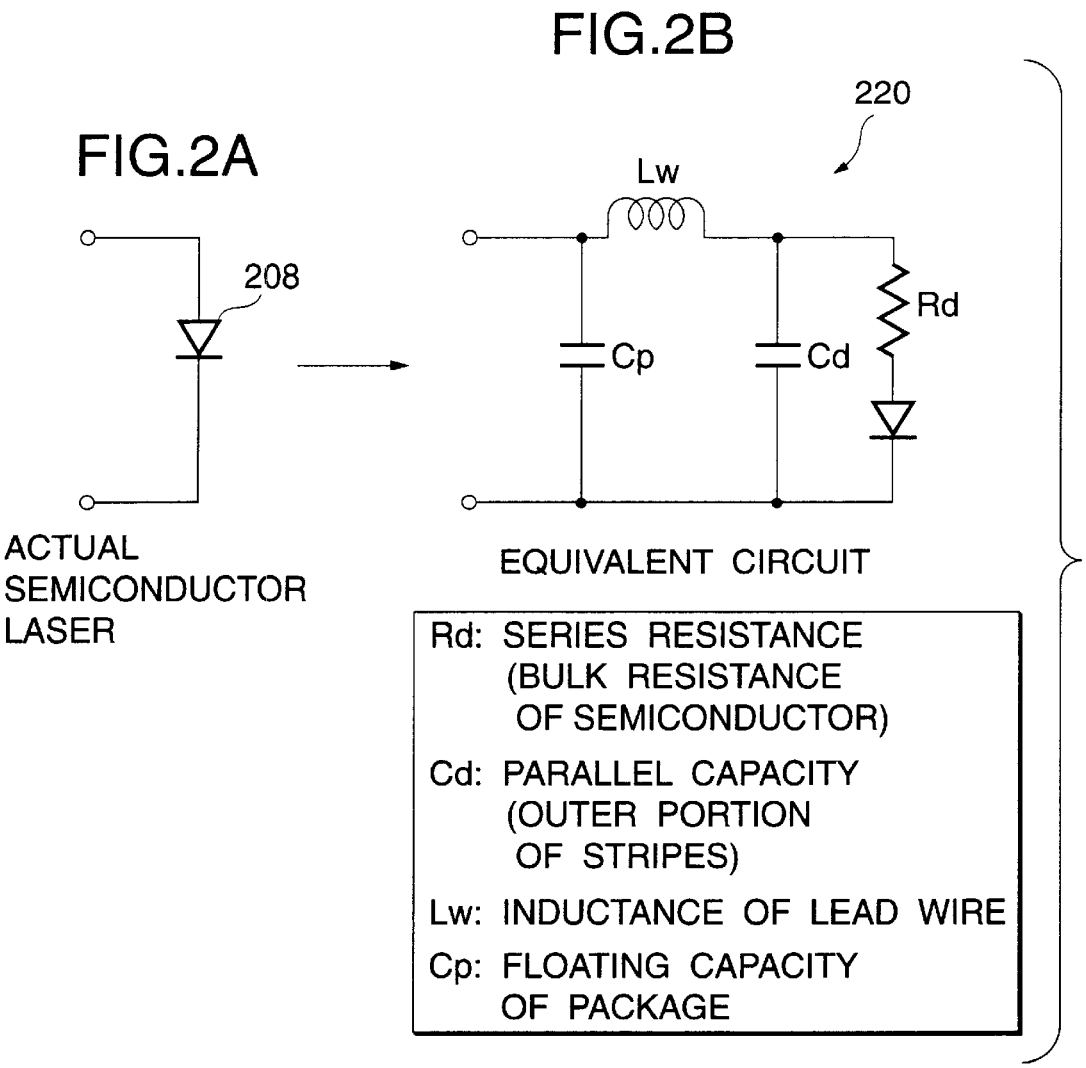

FIG.7
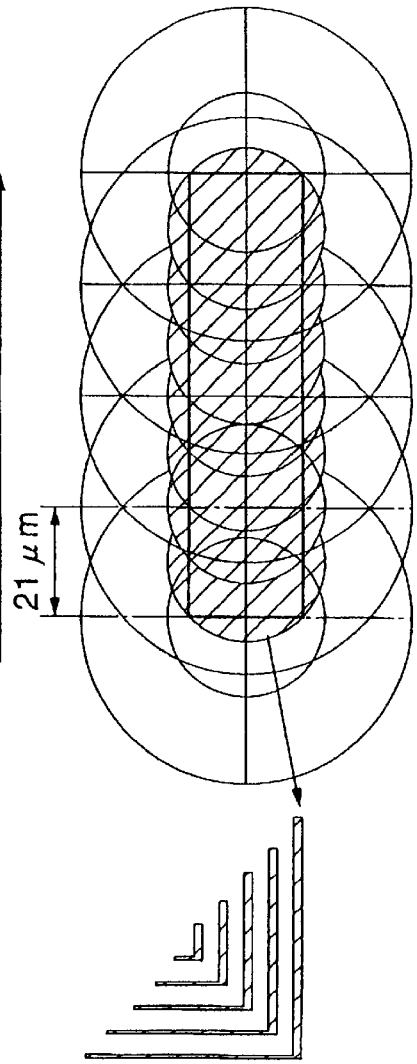
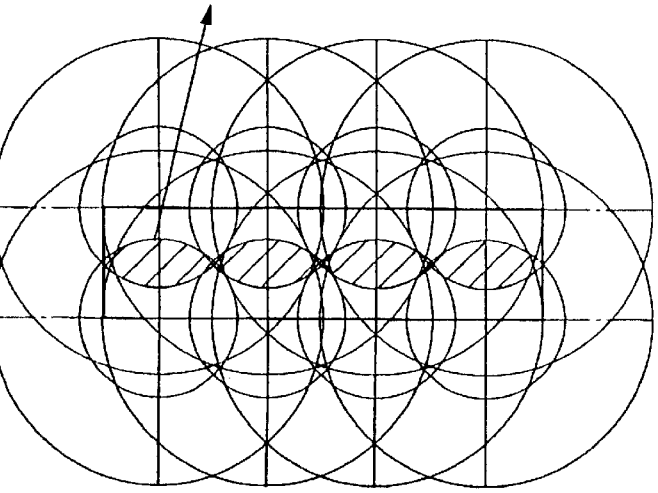

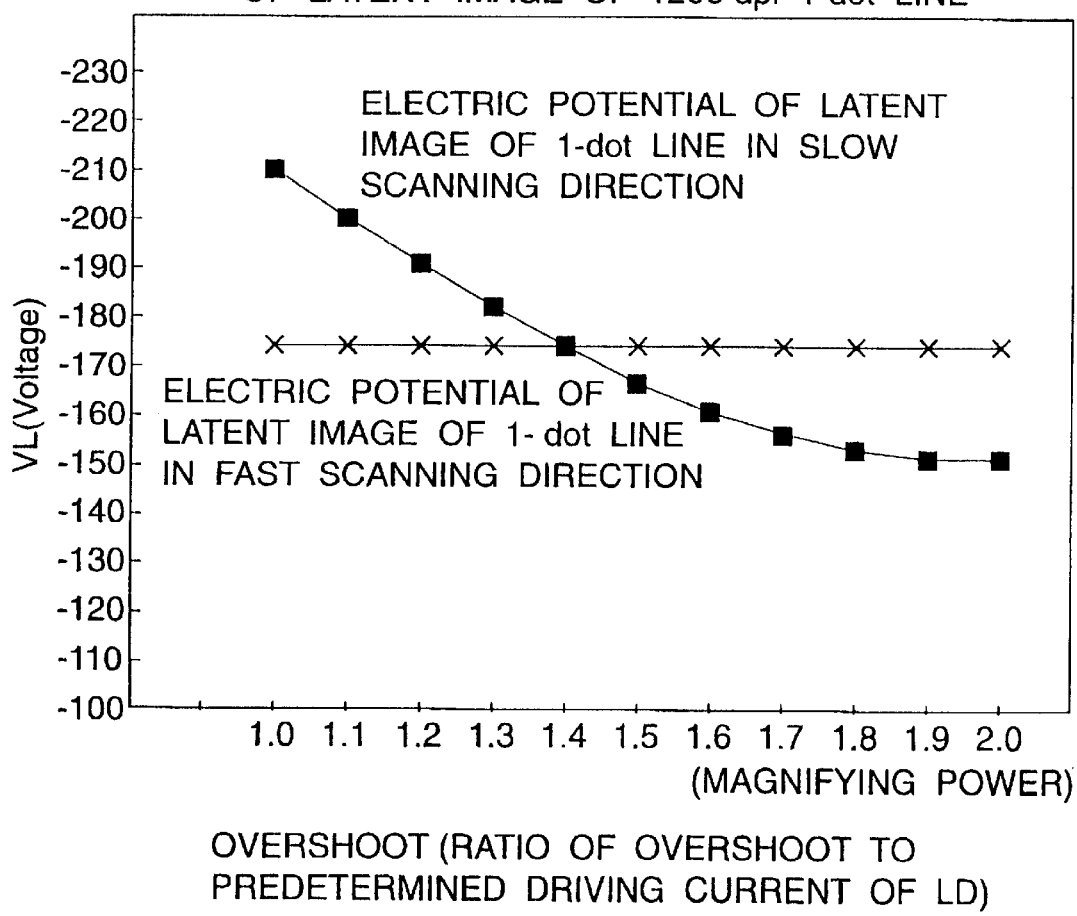

FIG.9A
TIME AT WHICH OVERSHOOTING WIDTH FOR FORMING ONE dot OF 1200 dpi IS 100%

FAST SCANNING DIRECTION

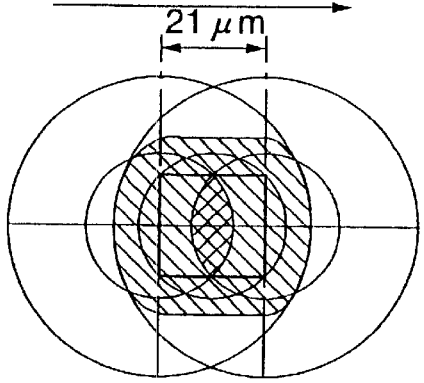

FIG.9B
TIME AT WHICH OVERSHOOTING WIDTH FOR FORMING ONE dot OF 1200 dpi IS 60%

FAST SCANNING DIRECTION

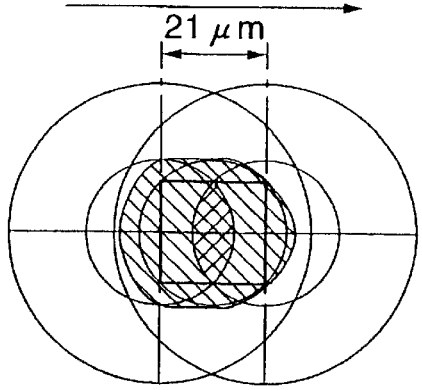

FIG.9C
TIME AT WHICH OVERSHOOTING WIDTH FOR FORMING ONE dot OF 1200 dpi IS 35%

FAST SCANNING DIRECTION

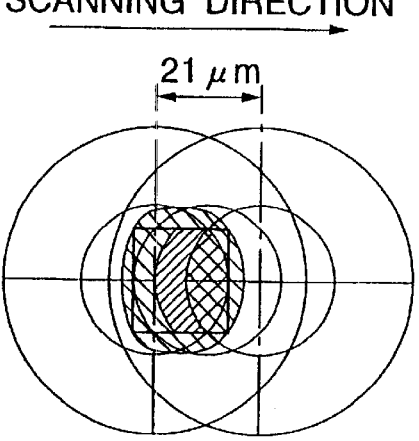

FIG.9D
TIME AT WHICH OVERSHOOTING WIDTH FOR FORMING ONE dot OF 1200 dpi IS 35% BEAM SPOT DIAMETER RATIO OF 1.25

FAST SCANNING DIRECTION

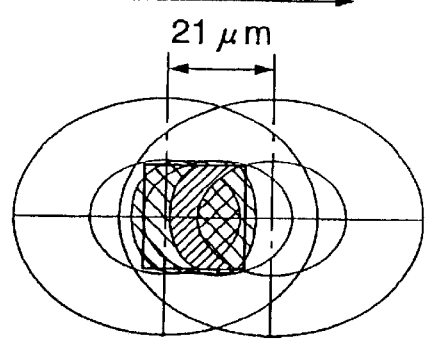

LD LIGHTING WAVEFORM
(OVERSHOOTING CIRCUIT IS NOT PROVIDED)

LD LIGHTING WAVEFORM
(OVERSHOOTING CIRCUIT IS PROVIDED)

PULSE WIDTH (SAME QUANTITY OF LIGHT)

LARGER ──────────────────→ SMALLER

OVERSHOOTING CIRCUIT IS NOT PROVIDED

OVERSHOOTING CIRCUIT IS PROVIDED

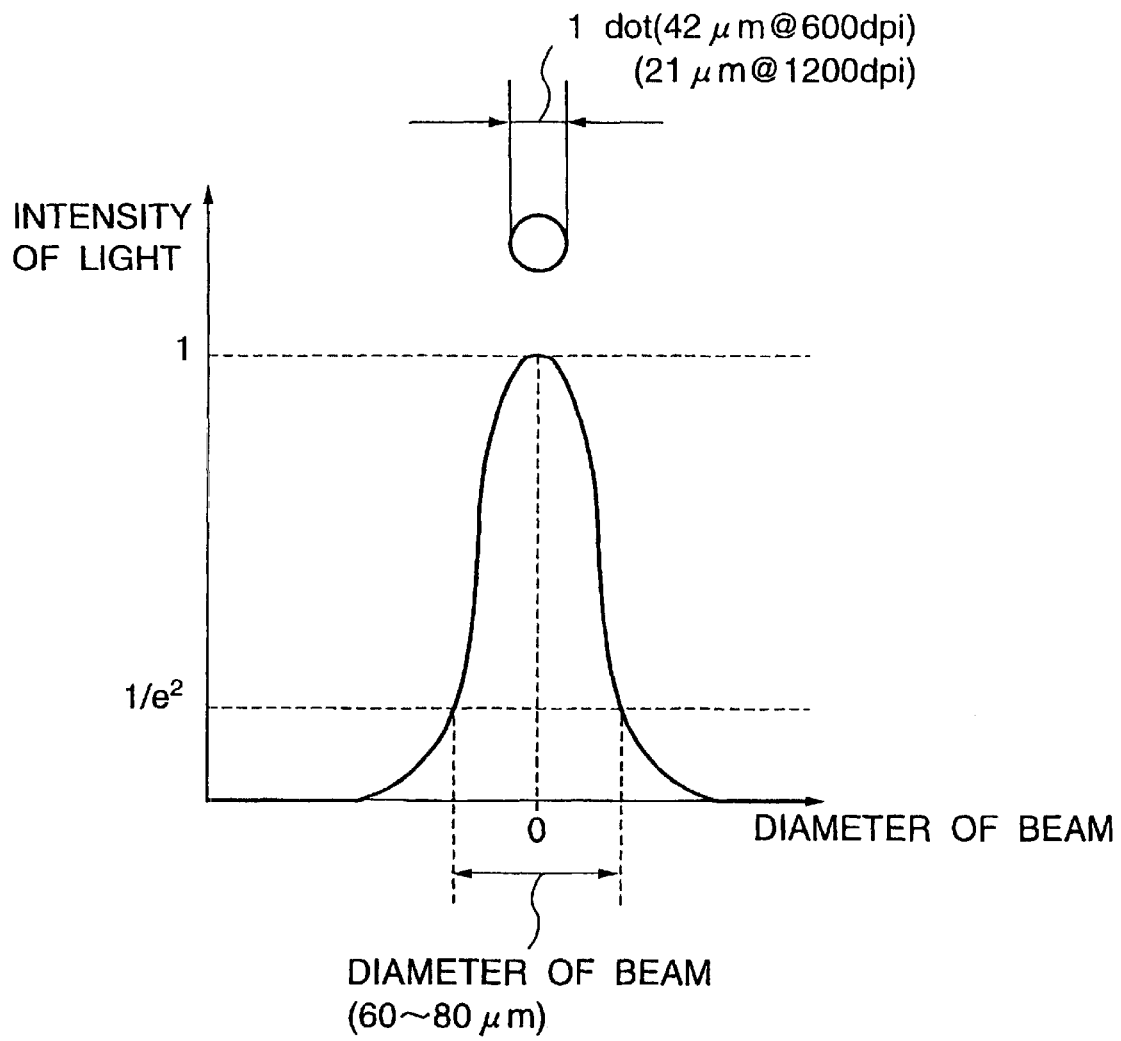

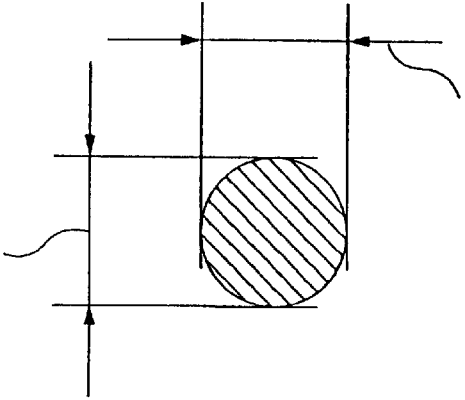
FIG.18C
Dt : DIAMETER OF BEAM SPOT IN FAST SCANNING DIRECTION OF BEAM
Ds : DIAMETER OF BEAM SPOT IN SLOW SCANNING DIRECTION OF BEAM
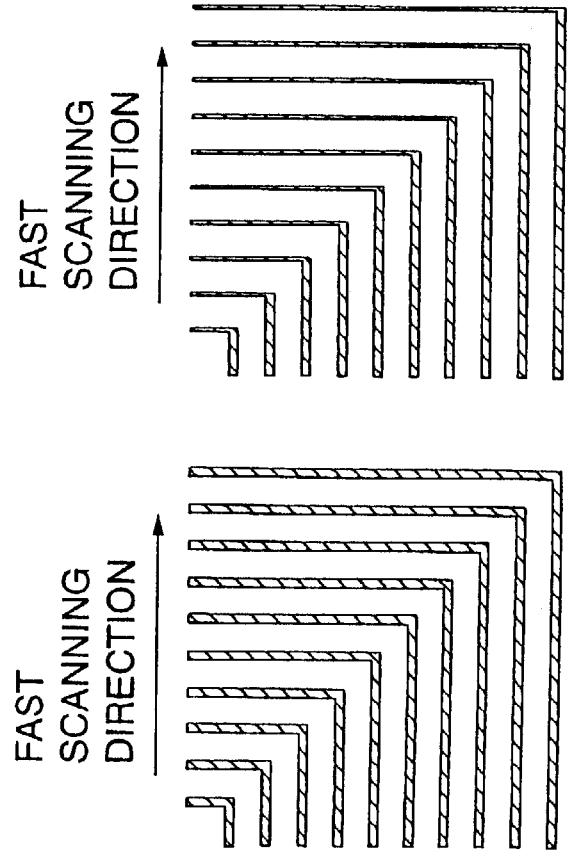
FIG.18A
FAST SCANNING DIRECTION
FIG.18B
FAST SCANNING DIRECTION

SCANNING EXPOSURE UNIT, SEMICONDUCTOR LASER DRIVING CIRCUIT AND IMAGE FORMING APPARATUS

BACKGROUND OF THE INVENTION

1. Field of the Invention

This invention relates to a scanning exposure unit, a semiconductor laser driving circuit and an image forming apparatus, and more particularly to a scanning exposure unit adapted to turn on a semiconductor laser on the basis of image information and scan and expose a photosensitive body with a laser beam outputted from a semiconductor laser; a semiconductor laser driving circuit; and an image forming apparatus.

2. Description of the Related Art

An image forming apparatus of an electrostatic system utilizing a laser, including a laser printer is being spread at present. In this image forming apparatus utilizing a laser (mainly, a semiconductor laser, which will hereinafter be referred to as "LD"), a scanning exposure unit adapted to scan and expose a photosensitive body with a laser beam is used.

To be more exact, an electrostatic latent image is formed on a photosensitive body a surface of which is uniformly charged with the scanning exposure unit, by scanning the same surface with a laser beam modulated on the basis of image data. After this electrostatic latent image has been developed with a toner supplied thereto, transfer paper is superposed on a developed toner image, and the toner image is transferred onto the transfer paper by having the toner electrostatically adsorbed to an outer surface of the transfer paper. The transferred toner image is then fixed by applying heat or a pressure to the transfer paper, to form an image.

A LD driving method used in the scanning exposure unit will now be described. In the case where an electrostatic latent image is formed by using a laser beam, the condition of formation of an electrostatic latent image differs with an optical intensity (quantity) of the laser beam, so that it is necessary to drive the LD so as to obtain a laser beam of a predetermined optical intensity (a predetermined quantity of output light). As shown in FIG. 12, the LD has the characteristics of outputting coherent light when a driving current therefor has attained a predetermined level (which will hereinafter be referred to as "threshold current") Ith.

In order to form an electrostatic latent image on a photosensitive body, it is necessary to output a laser beam modulated on the basis of an image signal (video signal) based on image data, i.e., on the basis of an ON/OFF signal indicating the turning on and off of the LD.

Therefore, as shown in FIG. 13, a LD driving circuit 400 was provided with a current source 404 for supplying a current corresponding to a desired intensity of light to a LD402, and a switching circuit 406 for modulating a laser beam outputted from LD402 on the basis of image data. The current source 404 is adapted to supply an electric current a level of which corresponds to that of a set voltage to LD402 through the switching circuit 406, and the switching circuit 406 is adapted to supply the electric current to and stop the electric current flowing to LD402, on the basis of the video signal. This enables a laser beam having a desired optical intensity and modulated on the basis of image data to be outputted. Such a modulation method is generally called a pulse width modulation (PWM) system.

The modulation methods positively utilizing the fact that the condition of formation of a latent image differs with a quantity of output light of a laser include a pulse amplitude modulation (PAM) system. In the formation of an image by this PAM system, an image is formed by varying an emission intensity (i.e. a quantity of output light) of LD on the basis of the image data.

Japanese Patent Laid-Open No. 206366/1989 discloses the techniques concerning the driving of LD by the PAM system. According to the techniques, some of plural LD driving current sources are selected on the basis of an intensity setting signal from the outside, and the sum of the currents from the selected current sources is supplied to the LD, whereby the intensity of light (quantity of output light) of LD can be varied. In general, when the optical intensity increases, the range in which a latent image is formed increases, and a dot image developed becomes large as compared with that developed when the optical intensity is low.

In an image forming apparatus, an image besides ordinary letters is printed in some cases, and it is known that the quality of an image, especially, the reproducibility of an intermediate color (which will hereinafter be referred to as "halftone") receives the influence of transitional characteristics of LD being modulated.

For example, Japanese Patent Laid-Open No. 2051:83/1989 discloses that, when LD is turned on and off by a modulation signal (pulse signal), fluctuation occurs in an optical output in a transitional period, which causes nonuniformity of the density of an image formed, failure in the formation of a beautiful (rectangular) pulse waveform corresponding to the modulation signal, and failure in the faithful reproduction of a halftone of the image. Japanese Patent Laid-Open No 2878/1991 discloses that, when distortion occurs in a driving current of LD, a waveform of an optical output from the LD is also distorted to cause turbulence to occur in a dot image formed, and therefore a decrease in the quality of the image.

FIG. 14 shows waveforms of an optical output from LD. Referring to FIG. 14, a curve ① shows an ideal rectangular waveform of optical output, and a curve ② shows a waveform of optical output having a rounded rising edge, and a curve ② shows a waveform of optical output having a rippled rising edge. FIG. 15 shows the relation (output characteristics), which corresponds to each of the output waveforms of FIG. 14, between a pulse width and an average quantity of optical output in the PWM system.

In FIG. 15, a line ① shows ideal output characteristics corresponding to the waveform of optical output of the curve ① in FIG. 14 and generally called output characteristics having a lineality. Namely, an average quantity of optical output increases or decreases in proportion to an increase and a decrease in the duty of a pulse width.

In the case of the waveform (the curve ② in FIG. 14) having a rounded rising edge, the characteristics of an optical output become as shown the curve ② in FIG. 15. In this case, when the duty is large, the output characteristics do not differ greatly from those in the ideal case of the line ① in FIG. 15 but, when the duty is decreased, the average quantity of output light drops suddenly by a level corresponding to the rounded portion of the waveform. As a result, a minute image displayed by reducing the duty disappears and cannot be reproduced, and a low density (highlight) of a halftone becomes lower than a regular level and unable to be reproduced.

In the case of the waveform (the curve ③ in FIG. 14) having a rippled rising edge, the characteristics of an optical output become as shown the curve ③ in FIG. 15. In this case, when the duty is large, the output characteristics do not differ greatly, either, from those in the ideal case of the line ① in FIG. 15 but, when the duty is reduced, an average quantity of optical output becomes large contrariwise as compared with that of optical output in the case of the curve ② in FIG. 14. As a result, a minute image is crushed and cannot be reproduced, and the highlight becomes denser than a regular level and unable to be reproduced.

For these reasons, it has been necessary to set a waveform of an optical output being modulated to a turbulence-free rectangular waveform identical with a waveform of a modulation signal. To meet the requirements, the waveform of an optical output being modulated is corrected by using the differentiation circuit disclosed in Japanese Patent Laid-Open No. 205183/1989, or by using a more regular snubber circuit (refer to FIG. 16).

With the development of the digitization techniques and image processing techniques in recent years, the improving of the resolution of an image forming apparatus has been advanced increasingly, and a demand for attaining a resolution (corresponding to a genuine write density and not to a write density obtained by a correction process carried out in the fast scanning direction, in other words, corresponding to a write density in the slow scanning direction) for forming an image by dots the diameter of which is smaller than that of a laser beam from a scanning exposure apparatus has increased.

FIG. 17 shows the relation between the diameter of a laser beam from a regular scanning exposure unit using a 780 nm LD and a resolution thereof. The diameter of a laser beam is generally defined as a diameter of a point in which the optical intensity becomes $1/e^2$ (wherein e represents a bottom of a natural logarithm) in the center of the laser beam.

As shown in FIG. 17, a dot size (size of one dot) is determined as about 42 nm for obtaining a resolution of 600 dpi (dot per inch), and about 21 nm for obtaining a resolution of 1200 dpi, with respect to a diameter of 60–80 nm of a laser beam from a regular scanning exposure unit. Namely, even at a leading resolution at present of 600 dpi, a dot size has already become smaller than a diameter of a laser beam.

According to a related art scanning exposure unit, when a dot size is thus smaller than a diameter of a laser beam, a ratio (which will hereinafter be referred to as "height and width ratio") of a thickness of a scanning line in a fast scanning direction to that of scanning line in a slow scanning direction, and the reproducibility of one dot are deteriorated greatly, and the quality of an image lowers.

The height and width ratio will now be described in detail. An ideal value (normal value) of the height and width ratio is 1, i.e., the condition in which, even when lines of the same number of dots are drawn both in a longitudinal direction (slow scanning direction), and in a lateral direction (fast scanning direction) as shown in FIG. 18A, the thickness of the lines becomes equal is an ideal (normal) condition.

In general, in the formation of an image by the PWM system, the thickness of a line (lateral line) drawn in the lateral direction depends mainly upon a diameter Ds (refer to FIG. 18C) in the slow scanning direction of a laser beam. The thickness of a line (longitudinal line) drawn in the longitudinal direction depends mainly upon the lighting time of LD, the lighting time for one dot decreasing with an increase in the resolution.

Therefore, as shown in FIG. 18B, when the dot size is smaller than the diameter of the laser beam, the lateral line remains to have a thickness determined by the diameter Ds of the laser beam in the slow scanning direction, which thickness is larger than the dot size for attaining a desired resolution, while the longitudinal line conversely becomes thin.

To be more exact, during the development of an electrostatic latent image, more toner is deposited on a portion of a higher exposure rate of a photosensitive body, and less toner on a portion of a lower exposure rate thereof. When a photosensitive body is subjected to scanning exposure with a laser beam, with LD driven by an ideal waveform of an optical output, the exposure rate of the portion of the photosensitive body which corresponds to a position in the vicinity of a LD lighting starting position becomes lower than a predetermined exposure rate as shown in FIG. 19. When the exposure rate is low, a latent image formed on the photosensitive body becomes shallow, and the quantity of the toner deposited on the photosensitive body becomes lower (hatched portion) than a level required to print the image, to cause the so-called omission of image to occur. Consequently, the longitudinal line formed by turning on the LD for a short period of time becomes thin because of an increased resolution.

When the LD lighting time is lengthened, the longitudinal line can be thickened. Since the one dot lighting time is determined naturally on the basis of the resolution and in view of the optical designing of the image forming apparatus, the LD lighting time cannot be lengthened thoughtlessly even when the obtaining of a thicker longitudinal line is desired. When the optical intensity (quantity of optical output) of LD is reduced, the lateral line can be thinned but the longitudinal line is also thinned correspondingly.

After all, when the resolution increases, the lighting time for one dot determined in view of the optical designing of the apparatus becomes short and the longitudinal line becomes thinner, so that the height and width ratio keeps lowering. The shape of one dot in the toner image tends to have a larger longitudinal size due to an increase in the resolution, and the reproducibility of one dot decreases.

The deterioration of the height and width ratio and reproducibility of one dot also exert influence upon the reproducibility of a halftone. For example, when the area gradation of a dither system is utilized, the density of image is expressed by the number of pixels smeared away with dots in one screen cell formed of plural longitudinal and lateral pixels (sub-pixels) as shown in FIG. 20A, i.e. the area of a portion smeared away of one screen cell.

However, when one dot is elongated longitudinally as mentioned above, the pixels cannot be smeared away successfully as shown in FIG. 20B, and the area of a portion smeared away of one screen decreases, so that the reproducibility of highlight is deteriorated. When longitudinally adjacent dots overlap each other as shown in FIG. 20C, to cause the smoothness of density of an image to get out of order (so-called tone jump), and the dots to be arranged laterally, the density increases. In the case where a multiline screen is used, the reproducibility of highlight is also impaired for the same reasons.

Solving these problems by the PAM system is also conceivable. However, an increase in the operation time is demanded in proportion to the level of the resolution, and more number of current sources are required to solve the problem of setting a very low level of optical intensity. Therefore, the construction of a driving circuit becomes complicated, and the power consumption increases, so that this system is disadvantageous in view of the cost.

The reducing of the diameter of the laser beam is also conceivable but the diameter of the laser beam cannot be changed easily in a 780 nm LD, which is used generally at present, in view of the characteristics and cost thereof. Even when a LD of a wavelength shorter than 780 nm has become usable, it will encounter the same problems before long when the resolution has been further improved.

At present, these problems are made inconspicuous by changing the processing conditions for electrophotographs but it is easily anticipated that, when the resolution improving techniques have been further advanced in the future, solving the problems by merely changing the processing conditions will become difficult and a substantial solution must be considered.

SUMMARY OF THE INVENTION

The present invention has been made in view of the above circumstances, and provides a scanning exposure unit capable of forming at a low cost an image of a high quality with a resolution at which a dot size is smaller than a diameter of a laser beam, a semiconductor laser beam driving circuit and an image forming apparatus.

According to an aspect of the present invention, the scanning exposure unit, adapted to turn on a semiconductor laser on the basis of image information and subject a photosensitive body to scanning exposure with a laser beam outputted from the semiconductor laser, is provided. The optical intensity at a rising edge of the laser beam is increased to a level higher than that of a steady-state optical intensity at every laser beam lighting time.

With this aspect, the photosensitive body is exposed at an optical intensity higher than a steady-state optical intensity at a rising edge of the laser beam at every laser beam lighting time. This enables an exposure rate of the portion, on which only a shallow and narrow latent image can be formed by a related art scanning exposure unit, of the photosensitive body which corresponds to a position in the vicinity of a semiconductor laser lighting starting position to be increased, and a deep and wide latent image to be formed. Consequently, a height and width ratio and the reproducibility of one dot and a halftone at a resolution (dot size) smaller than the diameter of a laser beam can be improved, and an image of a high quality can be obtained.

In the above-described aspect, it is recommended that the optical intensity at a rising edge of the laser beam be increased by generating overshoot in an optical output from the semiconductor laser.

According to another aspect of the invention, the semiconductor laser driving circuit adapted to control the driving of a semiconductor laser used as a light source when a surface of a photosensitive body is scanned with and exposed to a laser beam has an optical output control circuit for setting the level of an optical output higher than that of a steady-state optical output and controlling the optical output when the lighting of the semiconductor laser is started.

With this aspect, an optical output the level of which is higher than that of a steady-state optical output can be obtained by an optical output control circuit when the lighting of the semiconductor laser is started. The time and the quantity of light for and at which the optical output, i.e. the optical output the level of which is higher than that of a steady-state optical output are maintained can also be controlled. This enables an exposure rate of the portion, on which only a shallow and narrow latent image can be formed by a related art apparatus, of the photosensitive body which corresponds to a position in the vicinity of a semiconductor laser lighting starting position to be increased, and a deep and wide latent image to be formed.

It is recommended that this optical output control circuit be formed of an overshooting circuit for generating overshoot in an optical output from the semiconductor laser as described in a fourth aspect of the invention.

It is also recommended that the overshooting circuit includes at least one of a resistor, an inductor and a capacitor (hereinafter referred to as R, L, and C), and is expressed by a linear differential equation of at least second order.

It is further recommended that the shape of overshoot generated by the overshooting circuit be optimized by setting the values of at least one of R, L, C on the basis of at least one of a writing density, a writing speed, and diameters of the beam spot in the fast and slow scanning directions.

According to a further aspect of the invention, the image forming apparatus has a scanning exposure unit to turn on a semiconductor laser by the semiconductor laser driving circuit of any of the above aspects, and on the basis of image information, subject a photosensitive body to scanning exposure by a laser beam, in which a level of an optical intensity at a rising edge thereof at every laser lighting time is higher than that of a steady-state optical intensity thereof, outputted from the semiconductor laser.

This enables an optical intensity higher than a steady-state optical intensity to be obtained, and a photosensitive body to be exposed at an optical intensity higher than a steady-state optical intensity, at a rising edge of the laser beam.

Namely, an exposure rate of the photosensitive body at a point in time close to a semiconductor laser lighting time, at which nothing but a shallow and narrow latent image can be formed by a related art scanning exposure unit, can be increased, and a deep and wide latent image can be formed. This enables a height and width ratio, and the reproducibility of one dot and a halftone at a resolution (dot size) smaller than the diameter of a laser beam to be improved, and a high-quality image to be obtained.

According to still another aspect of the invention, the image forming apparatus includes an exposure member for forming an electrostatic latent image on a photosensitive body by a laser beam, a developing member for electrostatically developing the electrostatic latent image with a toner and thereby forming a toner image on the photosensitive body, and a transfer member for transferring the toner image onto a transfer medium and thereby forming an image thereon, in which the exposure member has an optical output control member for increasing an optical intensity at a rising edge of the laser beam to a level higher than that of a steady-state optical intensity at every laser lighting time during the formation of the electrostatic latent image.

With this aspect, the optical intensity at a rising edge of the laser beam is controlled by the optical output control member at every laser lighting time so that this intensity increases to a level higher than that of a steady-state optical intensity. Accordingly, the exposure member is capable of exposing the photosensitive body with an optical intensity higher than a steady-state optical intensity at a laser lighting starting time, increasing to a high level an exposure rate of the photosensitive body at a point in time close to the laser lighting starting time at which nothing but a shallow and narrow latent image can be formed by a related art apparatus of this kind, and forming a deep and wide latent image. This enables a height and width ratio and the reproducibility of one dot and halftone in a case where a resolution (dot size) is smaller than the diameter of the laser beam to be improved, and a high-quality image to be obtained.

In this image forming operation, it is recommended that, as described in a ninth invention, the optical intensity at a rising edge of the laser beam converges at a point of not larger than 60%, preferably substantially 35% of the irradiation time for forming one pixel, and that a maximum value of this optical intensity be not lower than 1.1 times and not higher than 1.7 times, preferably substantially 1.4 times a value of a steady-state optical intensity.

It is also recommended that the laser beam be focused as a beam spot on an outer surface of the photosensitive body by an imaging forming device with an outer surface of the photosensitive body scanned relatively therewith to form an electrostatic image thereon, and that a diameter of the beam spot in the fast scanning direction be set larger than that in the slow scanning. Especially, it is recommended that the diameter of the beam spot in the fast scanning direction be set not smaller than 1.25 times that in the slow scanning direction thereof.

It is further recommended that the image forming apparatus has an environmental information obtaining member for obtaining environmental information including at least one of temperature and humidity, and a steady-state optical intensity control device for changing the steady-state optical intensity on the basis of the environmental information obtained by the environmental information obtaining member.

BRIEF DESCRIPTION OF THE DRAWINGS

Preferred embodiments of the present invention will be described in detail on the basis of the following figures, wherein:

FIGS. 2A and 2B are figures for describing the characteristics of a semiconductor laser, wherein:

FIG. 2A is a circuit diagram showing an actual semiconductor laser; and

FIG. 2B is an equivalent circuit diagram of FIG. 2A;

FIG. 7 is a conceptual diagram showing a one-dot line in the fast and slow scanning directions with an overshooting circuit not used;

FIG. 8 is a graph showing the relation between overshoots and electric potentials in the fast and slow scanning directions of a latent image in a central portion of a one-dot line;

FIG. 9A is a conceptual diagram showing the shape of a dot formed when a width of overshoot is 100%, FIG. 9B is a diagram showing the shape thereof formed when a width of overshoot is 60%, FIG. 9C is a diagram showing the shape thereof formed when a width of overshoot is 35%, and FIG. 9D is a diagram showing the shape thereof formed when a width of overshoot and a ratio (aspect ratio) of a diameter of a beam spot in the fast scanning direction to that in the slow scanning direction thereof are 35% and 1.25 respectively;

FIG. 17 is a diagram for describing the relation between a diameter of a laser beam and resolution;

FIGS. 18A to 18C are diagrams for describing a height and width ratio, wherein:

FIG. 18A shows an ideal condition of an image in which longitudinal lines and lateral lines are formed by the same number of dots;

FIG. 18B shows an image formed when a dot size is smaller than a diameter of a laser beam; and FIG. 18C shows the shape of a spot of a laser beam;

FIGS. 20A to 20C are diagrams for describing the lowering of the reproducibility of a halftone, wherein:

FIG. 20A is a diagram for describing an area gradation; and

FIGS. 20B and 20C are diagrams showing the dot-smeared condition in one screen in a case where a dot size is smaller than a diameter of a laser beam.

DESCRIPTION OF THE PREFERRED EMBODIMENTS

Before describing preferred embodiments, the outline of the present invention is explained in comparison with the above-described related arts.

Figure 16A:
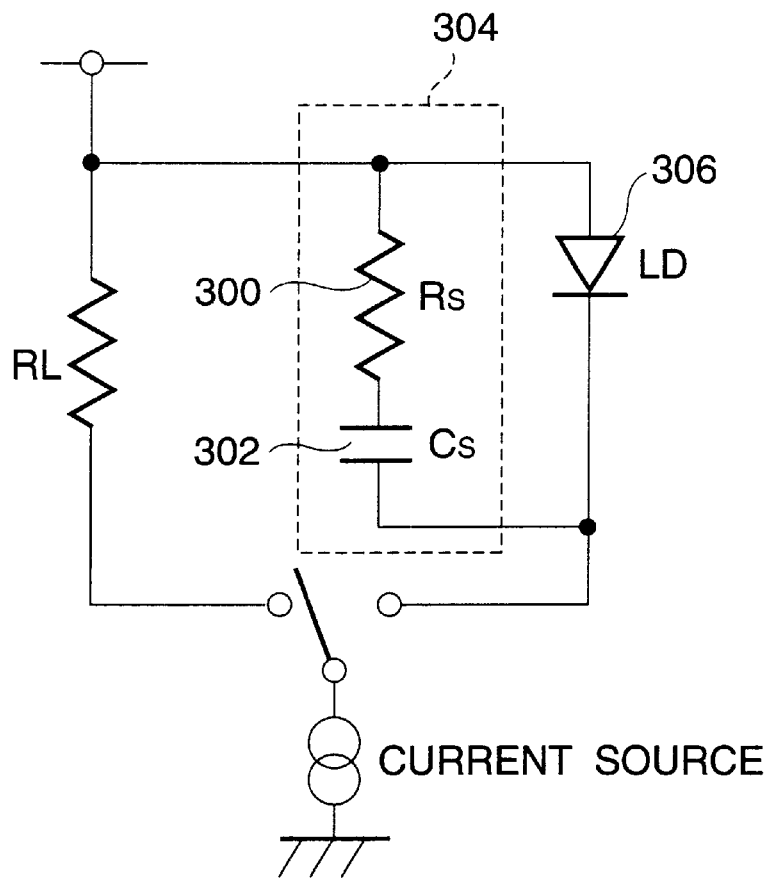
FIG. 16A is a diagram of the snubber circuit (related art)

In the related arts, a snubber circuit 304 including series-connected resistor 300 and capacitor 302 is provided in parallel with a LD 306, and a resistance value Rs of the resistor 300 and a capacitance value Cs of the capacitor 302 are selected so as to set an output waveform of the LD 306 to a rectangular shape as shown in FIG. 16A.

Figure 16B:
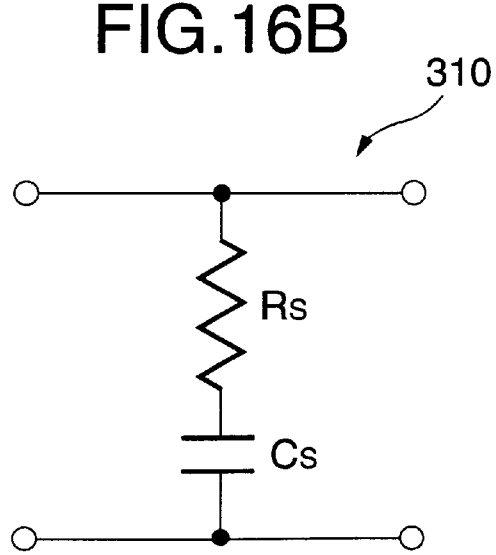
FIG. 16B is an equivalent circuit diagram of the circuit of FIG. 16A.
Figure 19:
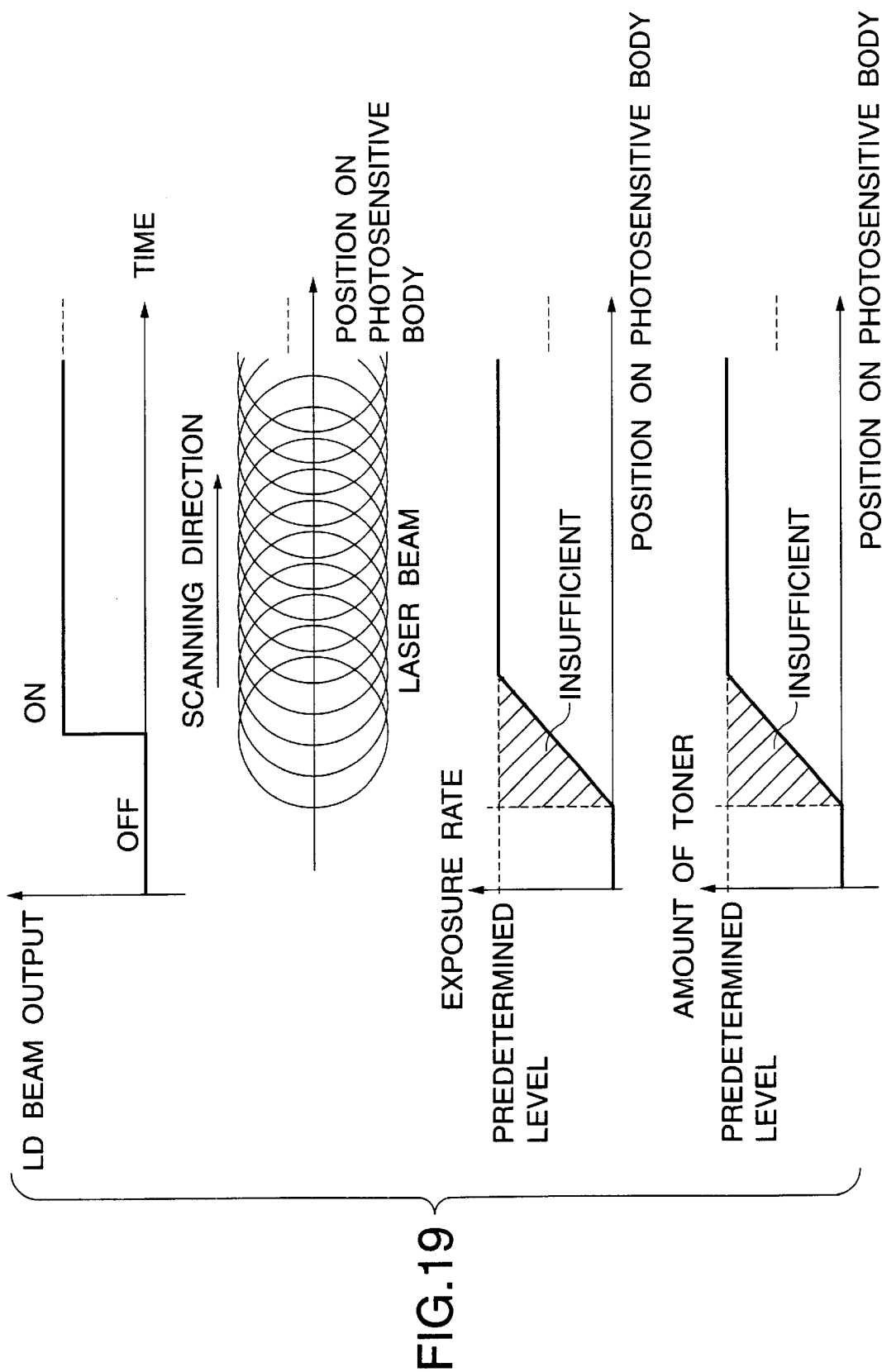
FIG. 19 is a diagram for describing the deterioration of the reproducibility of height and width ratio and one dot.
Figure 20C:
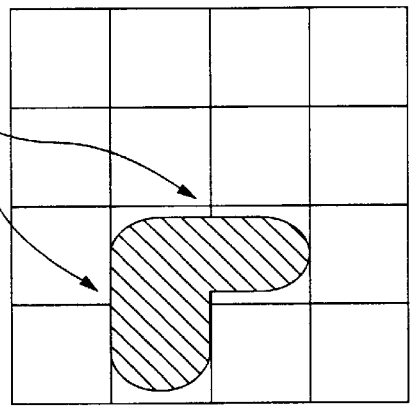
Figure 20B:
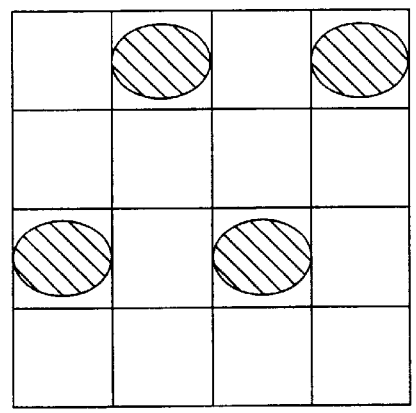
Figure 20A:
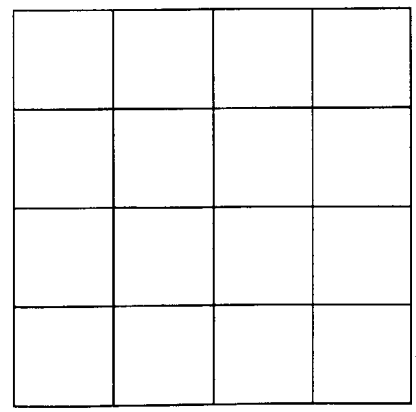

This snubber circuit 304 can be replaced with an equivalent circuit 310 shown in FIG. 16B. The response characteristics of this equivalent circuit 310 are expressed by a first-order linear differential equation shown in Equation (1).

$$V_c + C_s R_s \cdot dv_c/dt = E \tag{1}$$

(wherein Vc represents a voltage of the capacitor, and E a step voltage)

When the differential equation of Equation (1) is solved by substituting zero for Vc, $$V_c = E\{1 - \exp(-t/C_s R_s)\} \quad (2)$$

Therefore, $$1_c = E/Rs \, \exp(-t/C_s R_s)$$

$$1_{LD} = 1 - E/Rs \, \exp(-t/C_s R_s) \quad (3)$$

Namely, in the case of the snubber circuit 304, the response characteristics are represented by an integral of a one-story differential equation, and have an attenuation integral only, so that it could be utilized for holding down the turbulence of a waveform of an optical output.

Figure 1A:
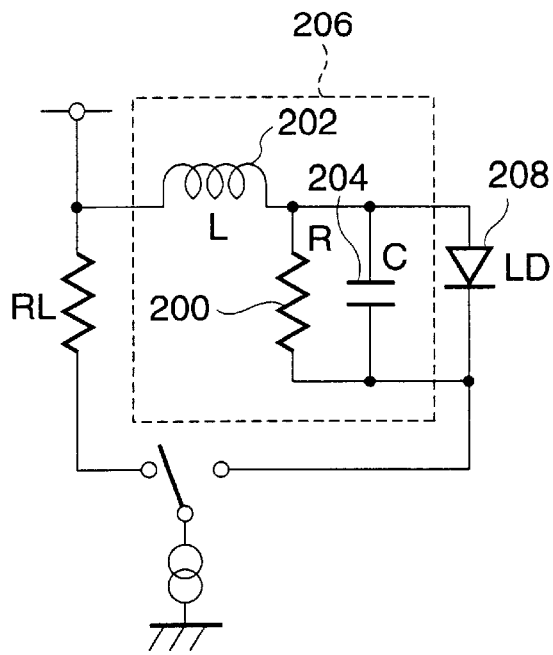
FIG. 1A is a diagram describing an RLC circuit as an overshooting circuit in the present invention.

An RLC circuit 206 shown in FIG. 1A and formed of a resistor 200, a coil 202 and a capacitor 204 is given as an example of the overshooting circuit. To be more exact, the RLC circuit 206 is formed by parallel-connecting the resistor 200 and capacitor 204 to LD 208, and series-connecting the coil 202 to the parallel-connected resistor 200 and capacitor 204 and LD 208. The RLC circuit will be described by representing a resistance value of the resistor 200 by R, inductance of the coil 202 by L, and capacitance of the capacitor 204 by C.

Figure 1B:
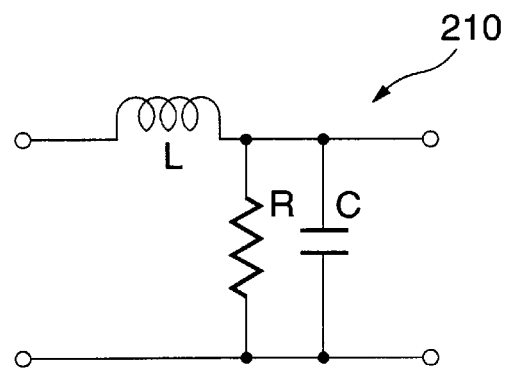
FIG. 1B shows an equivalent circuit of the RLC circuit of FIG. 1A.

This RLC circuit 206 can be replaced with the equivalent circuit 210 shown in FIG. 1B The response characteristics of the equivalent circuit 210 are expressed by a two-story differential equation shown in Equation (4).

$$d^2 v_0/dt^2 + 1/RC \cdot dv_0/dt + v_0/LC = E/LC \quad (4)$$

(wherein $V_0$ represents output voltage, and E step voltage)

A solution of a homogeneous equation in which a right side equals zero is generally in the form of an exponential function $e\lambda^t$, in which λ can be solved as shown in Equation (5).

$$\lambda = -1/2RC \pm \sqrt{\{(1/2RC)^2 - (1/RC)\}} \quad (5)$$

When a braking coefficient k and a resonance cycle T are defined as follows, $$k = -1/2R\sqrt{L/C}$$

$$T = 2\pi\sqrt{LC} \quad (6)$$

λ is expressed by Equation (7).

$$\lambda = -2\pi k/T \pm 2\pi\sqrt{k^2-1}/T \quad (7)$$

Therefore, a solution of a differential equation of a step response becomes:

$$V_0 = A \, \exp(\lambda_1 t) + B \, \exp(\lambda_2 t) + 1 \quad (8)$$

Namely, the degree (overshoot) of vibration (resonance) is determined by the magnitude of the braking coefficient k, and a cycle (width of overshoot) of resonance by the resonance cycle T.

Figure 1C:
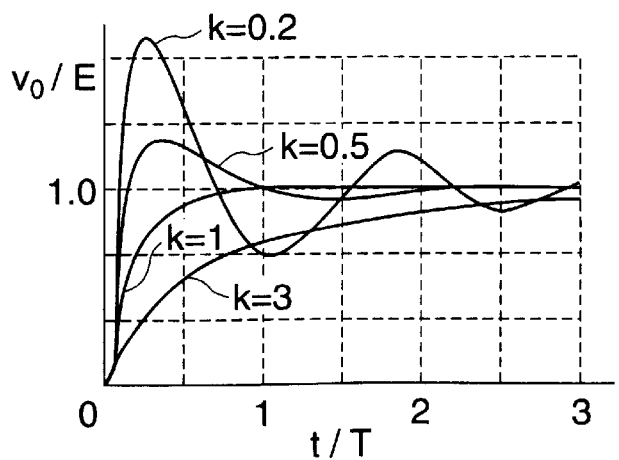
FIG. 1C is a drawing showing the results of a step response simulation of the RLC circuit of FIG. 1A.

FIG. 1C shows the results of a step response simulation of the RLC circuit 206. As is understood from FIG. 1C, when the braking coefficient k is not smaller than 1 (k ≧1), a solution of a differentiation equation of step response becomes an attenuation solution. Therefore, the occurrence of overshoot is held down, and response characteristics showing an output voltage value converging smoothly on a step voltage are attained. When the braking coefficient k is smaller than 1 (k<1), i.e., when a solution of an imaginary number is obtained, a vibration (resonance) solution is obtained to cause overshoot to occur. It is also understood that, as a value of the braking coefficient k decreases, the degree of overshoot occurrence increases.

Namely, when R, L, C are set so that a solution of a differential equation of at least second order representing the response characteristics becomes a vibration solution (solution of an imaginary number), overshoot can be generated in a transitional period. A differential equation of at least second order may also be utilized as a method of obtaining a detailed approximation. In this case, R, L, C may also be set so as to obtain a vibration solution (solution of an imaginary number).

As shown in FIG. 2, the LD 208 itself can also be replaced with an equivalent circuit 220 including a resistor, a capacitor and a coil. Namely, the LD 208 itself also has in practice a resistance component, a capacitance component and an inductance component. Mainly, the resistance component is based on series resistance (Rd) ascribed to contact resistance of electrodes and bulk resistance of a semiconductor, the capacitance component parallel capacity (Cd) from the outside of stripes and floating capacity (Cp) of a package, and the inductance component inductance (Lw) of a lead wire. The parallel capacity (Cd) from the outside of stripes depends upon a material between a p-side electrode and a n-side electrode and an area thereof, while the order of contribution to impedance of the floating capacity (Cp) of a package is low as compared with those of the other components, so that the floating capacity can be ignored.

An RLC circuit provided with the resistor 200, coil 202 and capacitor 204 is shown in FIG. 1 as an example of the overshooting circuit. However, desired response characteristics can also be obtained by utilizing the resistance component, capacitance component and inductance component of the LD 208 itself even when any one of the resistor 200, coil 202 and capacitor 204 is omitted. When occasion demands, a resistance component, a capacitance component and an inductance component derived from a substrate on which the LD 208 is mounted and art work can also be utilized. Namely, even when all of the resistor, coil and capacitor are not used, in other words, even when a combination of two of these parts, or one only thereof is used, an overshooting circuit can be attained in some cases.

The time and the quantity of light for producing an optical output the level of which is higher than that of a steady-state optical output are determined by a shape of overshoot (width and amount of overshoot). The shape of overshoot is fixed by a braking coefficient k and a resonance cycle T as mentioned above, and, when R, L, C are set so as to obtain a desired shape of overshoot, the time and the quantity of light which produce an optical output the level of which is higher than a steady-state level can be controlled to desired levels.

The preferred embodiments of the present invention will now be described with reference to the drawings.

(General Construction)

Figure 3:
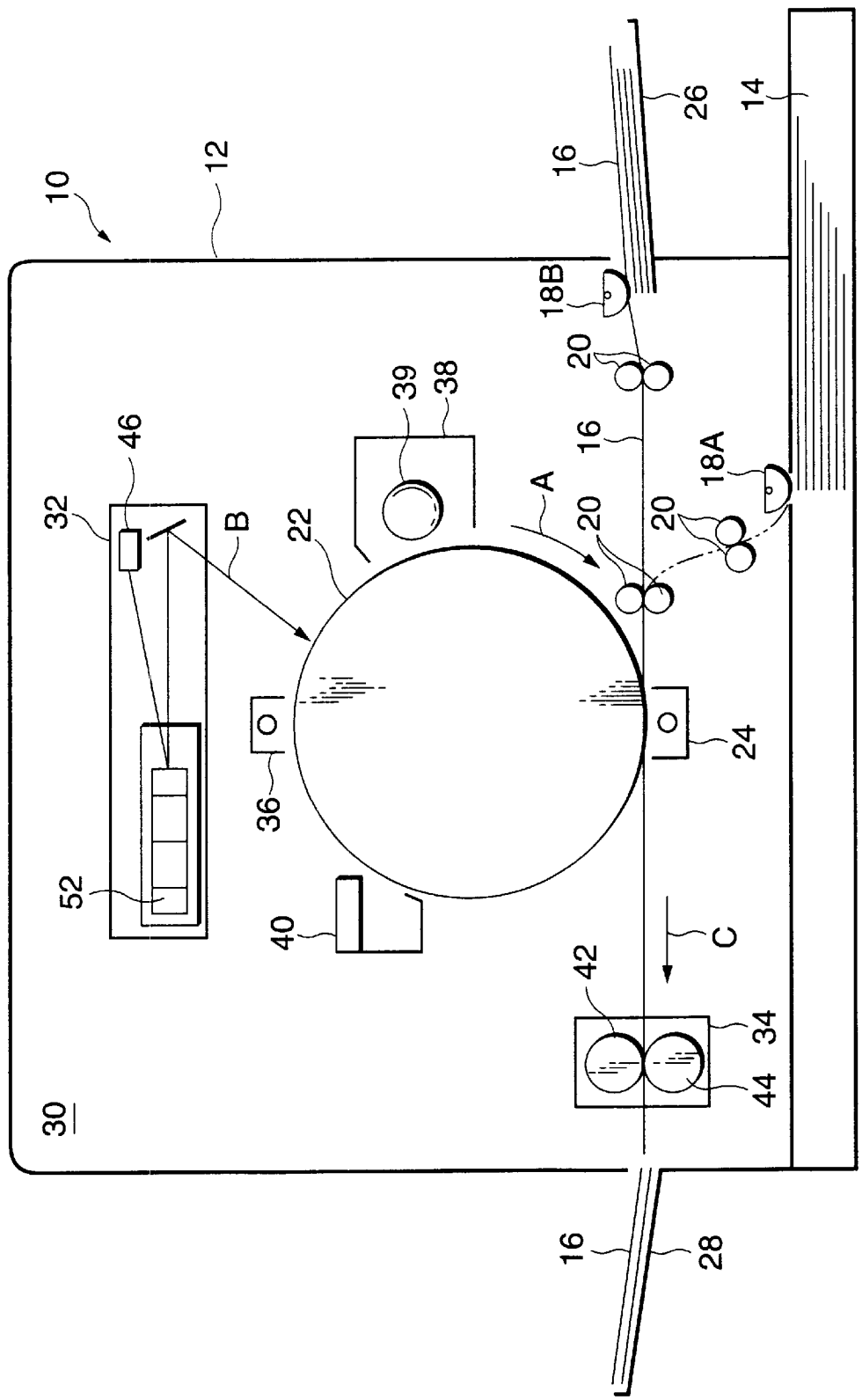
FIG. 3 is a schematic diagram showing a construction of an image forming apparatus in an embodiment of the present invention.

FIG. 3 shows an image forming apparatus 10 of an electrophotographic system to which the present invention is applied. As shown in FIG. 3, the image forming apparatus 10 is covered with a casing 12.

At a lower portion of the image forming apparatus 10, a sheet tray 14 is provided. The sheet tray 14 is provided therein with sheets 16 of a desired size, for example, B5 size, B4 size, A4 size and A3 size. At the portion of the sheet tray 14 which is in the vicinity of a sheet discharge section thereof, a semicircular roller 18A is provided. The semicircular roller 18A is adapted to send out the sheets 16, which are supplied to the sheet tray 14, one by one from an upper side thereof in order. A sheet 16 sent out from the sheet tray 14 is transferred by plural pairs of transfer rollers 20 to a space between a photosensitive body 22 and a transfer charging member 24 which will be described later.

One side wall (right side wall in FIG. 3) of the image forming apparatus 10 is provided with a manual feed tray 26 for feeding the sheets 16 manually as necessary. At the portion of the manual feed tray 26 which is in the vicinity of a sheet discharge section thereof, a semicircular roller 18B is provided as in the case of the sheet tray 14 so as to enable the sheets 16 to be sent out one by one from an upper side thereof.

The side wall (left side wall in FIG. 3) of the image forming apparatus 10 which is opposed to the wall in which the manual feed tray 26 is provided has a discharge tray 28 into which the sheets 16 on which a desired image is formed are discharged.

The casing 12 is provided in the interior thereof with an image forming section 30. The image forming section 30 is formed so as to include a cylindrical photosensitive drum (which will hereinafter be referred to simply as a photosensitive body) 22 rotating at a constant speed in the direction of an arrow A shown in FIG. 3, a scanning exposure unit 32 adapted to apply a laser beam (refer to an arrow B in FIG. 3) to the photosensitive body 22 on the basis of image data (converted into gray scale image data by subjecting the image data to an image processing operation since the image forming apparatus 10 in this mode of embodiment is directed to a black-and-white image) obtained by reading an original by a scanner and subjecting a read image to various kinds of image processing operations, and a fixing member 34 for fixing a desired image on the sheets 16. In this mode of embodiment, a rotational peripheral speed of the photosensitive body 22 is 120 mm/s.

A charging member 36 is provided in the vicinity of a circumferential surface of the photosensitive body 22. The charging member 36 is adapted to uniformly charge the photosensitive body 22. To be exact, an AC voltage having a peak-to-peak value of 2 kV and a –500 V grid voltage are applied to the charging member 36, and the portion of the surface of the photosensitive body 22 which has passed a charging portion of the charging member 36 is charged uniformly at –500 V.

The photosensitive body 22 charged uniformly by the charging member 36 is irradiated with a laser beam and exposed as the photosensitive body is rotated in the direction of the arrow A shown in FIG. 3. Consequently, a latent image is formed on the photosensitive body 22. In concrete terms, in an exposed portion, positive charge occurs from a photosensitive layer of the photosensitive body 22, and a –150 V latent image is formed thereon. A –150 V latent image potential referred to in this embodiment is a converging potential occurring when the whole surface exposure is carried out by the scanning exposure unit 32, i.e., when the scanning of an image region as a whole is done.

A developing member 38 adapted to supply a toner to the photosensitive body 22 and opposed to the circumferential surface of the photosensitive body 22 is provided in a position on the downstream side with respect to the rotational direction of the photosensitive body 22 of a position in which the photosensitive body is irradiated with a laser beam from the scanning exposure unit 32. The toner supplied from the developing member 38 is deposited on the portion of the photosensitive body 22 which has been irradiated with a laser beam advancing in the direction of the arrow B shown in FIG. 3 by the scanning exposure unit 32. Consequently, a toner image is formed on the photosensitive body 22.

To be concrete, the developing member 38 is provided with a developing roll 39 placed therein with a 0.35 mm clearance left with respect to the surface of the photosensitive body 22. The developing roll 39 is rotated in accordance with the rotation of the photosensitive body 22 with a thin layer of the toner supported on the surface of the former. A developing bias voltage in which a DC voltage and an AC voltage are superposed on each other is applied to the developing roll 39. In concrete terms, a rectangular wave having a DC component of –400 V, an AC voltage of 2400 Hz, a peak-to-peak value of 1.6 kV and a duty ratio of 50:50 is used.

In the latent image formed on the photosensitive body 22, a background portion is at –500 V, and a latent image portion at –150 V. In the toner charged to have a negative polarity by the developing bias voltage (–400 V), an electric field force directed from the photosensitive body 22 to the developing roll 39 works on the background portion, while an electric field force directed from the developing roll 39 to the photosensitive body 22 works on the latent image portion. Owing to such electric field force, the toner is electrostatically adsorbed to the latent image portion of the photosensitive body 22, and a toner image is formed.

In this mode of embodiment, the image forming apparatus is formed with the photosensitive body 22 and developing roll 39 arranged in a non-contacting state. A contact type image forming apparatus with a photosensitive body 22 and a developing roll 39 arranged in a contacting state may also be employed.

The toner in use is a magnetic-single-component developer, which is charged to have a negative polarity when the toner passes a pressure contacting section in which a layer thickness regulating member is brought into pressure contact with the developing roll 39 during the rotation of the developing roll 39. In the case of a magnetic developer (toner), toner is held and retained on the surface of the developing roll 39 by a magnet member contained in the developing roll 39, and a non-magnetic toner and a two-component developer are also retained by an image force occurring due to the charging of each particle and applied to the surface of the developing roll 39. Needless to say, the developing operation is carried out by using a difference between the electric potential of the surface of the photosensitive body 22 and the developing bias potential applied to the developing roll 39. Therefore, the toner is not limited to a magnetic one-component toner but a non-magnetic toner and a two-component developer may also be used as long as the toner is of a system in which the developing bias potential is accompanied by an AC voltage. Although the charging polarity is set negative in this mode of embodiment, it may be set positive.

A transfer charging member 24 is provided in a position which is on the downstream side (perpendicular position under the axis of the photosensitive body 22) with respect to the rotational direction of the photosensitive body 22 of the position in which the developing member 38 is provided, so as to be opposed to the circumferential surface of the photosensitive body 22. The transfer charging member 24 is adapted to transfer the toner image formed on the photosensitive body 22 onto the sheets 16.

A cleaner 40 is provided in a position which is on the downstream side with respect to the rotational direction of the photosensitive body 22 of the position in which the transfer charging member 24 is provided, so as to be opposed to the photosensitive body 22. The toner residing on the surface of the photosensitive body 22 is removed by the cleaner 40 after the completion of a transfer operation.

The sheets 16 to which the toner image has been transferred are sent in the direction of an arrow C shown in FIG. 3. A fixing device 34 formed so as to contain a pressure roller 42 and a heating roller 44 therein is provided on the downstream side of the photosensitive body 22 with respect to the direction in which the sheets 16 are sent. In the fixing device 34, a sheet 16 sent thereto and having a toner image transferred thereto is heated and pressed so as to melt and fix the toner. Namely, in the fixing device 34, a so-called fixing process is carried out, and a predetermined image is formed on the sheet 16.

(Detailed Construction of the Scanning Exposure Unit)

Figure 4:
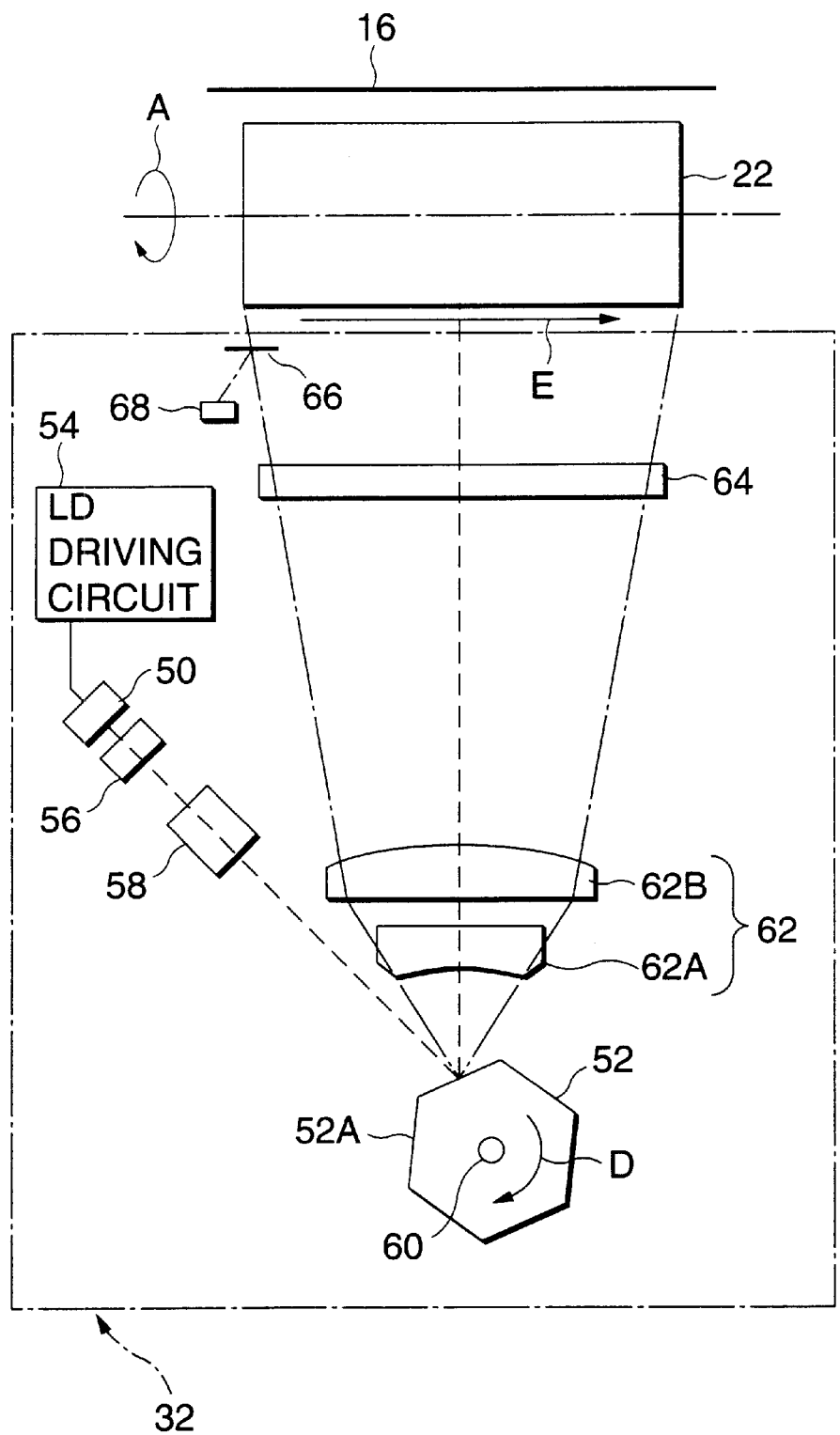
FIG. 4 is a schematic diagram showing a construction of a scanning exposure unit in the embodiment of the present invention.

The scanning exposure unit 32 will now be described with reference to FIG. 4. FIG. 4 shows a schematic construction of the scanning exposure unit 32. One laser beam is outputted from this scanning exposure unit 32.

The scanning exposure unit 32 is provided with LD 50 as a light source, and a rotary polygon mirror 52 adapted to reflect thereon a laser beam sent out from the LD 50 and apply the laser beam to the photosensitive body 22.

The LD 50 is connected to a LD driving circuit 54, which will be described later, and controlled so that a laser beam is sent out on the basis of image data. A collimator lens 56 is provided on the downstream side of the LD 50 with respect to the direction of advance of the laser beam sent out from the LD 50. The collimator lens 56 is adapted to convert a laser beam sent out from the LD 50 from diffused rays of light into parallel rays of light. The laser beam converted into parallel rays of light by the collimator lens 56 enters the rotary polygon mirror 52 via a cylinder lens 58.

The rotary polygon mirror 52 is formed to a right polygonal shape (right hexagonal shape in this mode of embodiment) provided with plural reflecting surfaces 52A on side portions thereof, and the incident laser beam converges on one of these reflecting surfaces 52A.

The rotary polygon mirror 52 is fixed to a motor (not shown) via a shaft, and adapted to be rotated around a rotary shaft 60 in the direction of an arrow D. Namely, an incident angle of the laser beam with respect to each reflecting surface 52A varies continuously, and the laser beam is deflected continuously. Owing to this arrangement, a scanning operation is carried out in the axial direction (direction of an arrow E in FIG. 4, which will hereinafter be referred to as "fast scanning direction") of the photosensitive body 22, during which the laser beam is applied to the photosensitive body 22.

In the direction of advance of the laser beam reflected on the rotary polygon mirror 52, a fθ lens 62 formed of first and second lenses 62A, 62B is provided. Owing to this fθ lens 62, a scanning speed during the irradiation of the photosensitive body 22 with the laser beam is set constant, and an imaging point is formed on the circumferential surface of the photosensitive body 22.

The laser beam which has passed through the fθ lens is refracted by a reflecting mirror 64 and then applied to the photosensitive body 22. In the direction of advance of the laser beam and on the upstream side of the fast scanning direction (in the direction of an extreme left end of the photosensitive body 22 in FIG. 4), a mirror 66 is provided. A photodetector 68 is provided in the direction in which the laser beam reflected on the mirror 66 advances.

Every time the photosensitive body 22 is scanned with the laser beam in the axial direction thereof, the laser beam advancing to the extreme left end thereof is reflected on the mirror 66, and the resultant laser beam enters the photodetector 68. Namely, the photodetector 68 is capable of detecting the irradiation starting time (so-called SOS representing "Start of Scan") of the scanning exposure unit 32 for every scanning line on the photosensitive body 22.

(Construction of LD Driving Circuit)

Figure 5:
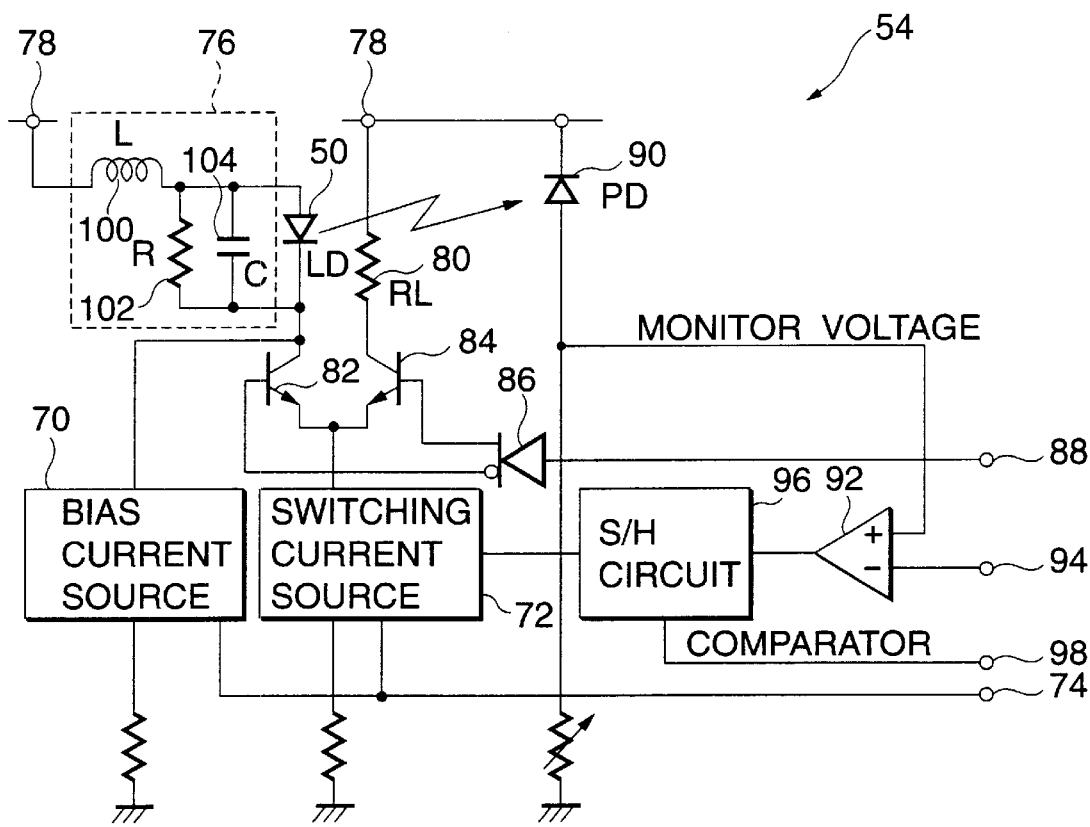
FIG. 5 is a circuit diagram of a LD driving circuit in the embodiment of the present invention.

The LD driving circuit 54 will now be described with reference to FIG. 5. FIG. 5 is a wiring diagram of the LD driving circuit 54.

As shown in FIG. 5, the LD driving circuit 54 is provided with a bias current source 70 for supplying a bias current of a predetermined current value to the LD 50, and a switching current source 72 for supplying a switching current of a predetermined current value to the LD 50.

The bias current source 70 and switching current source 72 are grounded via resistors. The bias current source 70 and switching current source 72 are connected to an enable (ENB) terminal 74, and adapted to function when an ENB signal from the ENB terminal 74 is inputted thereinto (the ENB signal is usually on).

The bias current source 70 is connected to the LD 50. The LD 50 is connected to a power source terminal 78 via an RLC circuit 76 (which will be described later) for generating overshoot, and a predetermined voltage can be applied from the power source terminal 78 to the LD 50.

Figure 12:
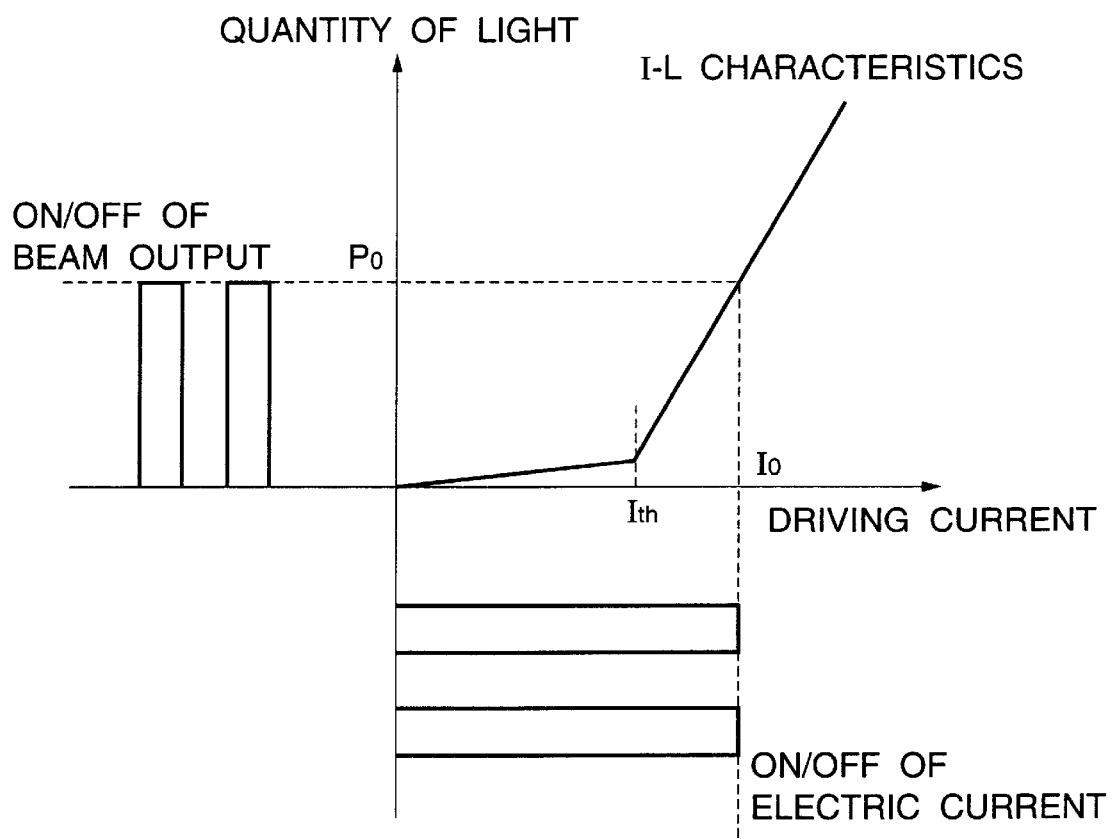
FIG. 12 is a diagram showing the output characteristics of a general LD.
Figure 13:
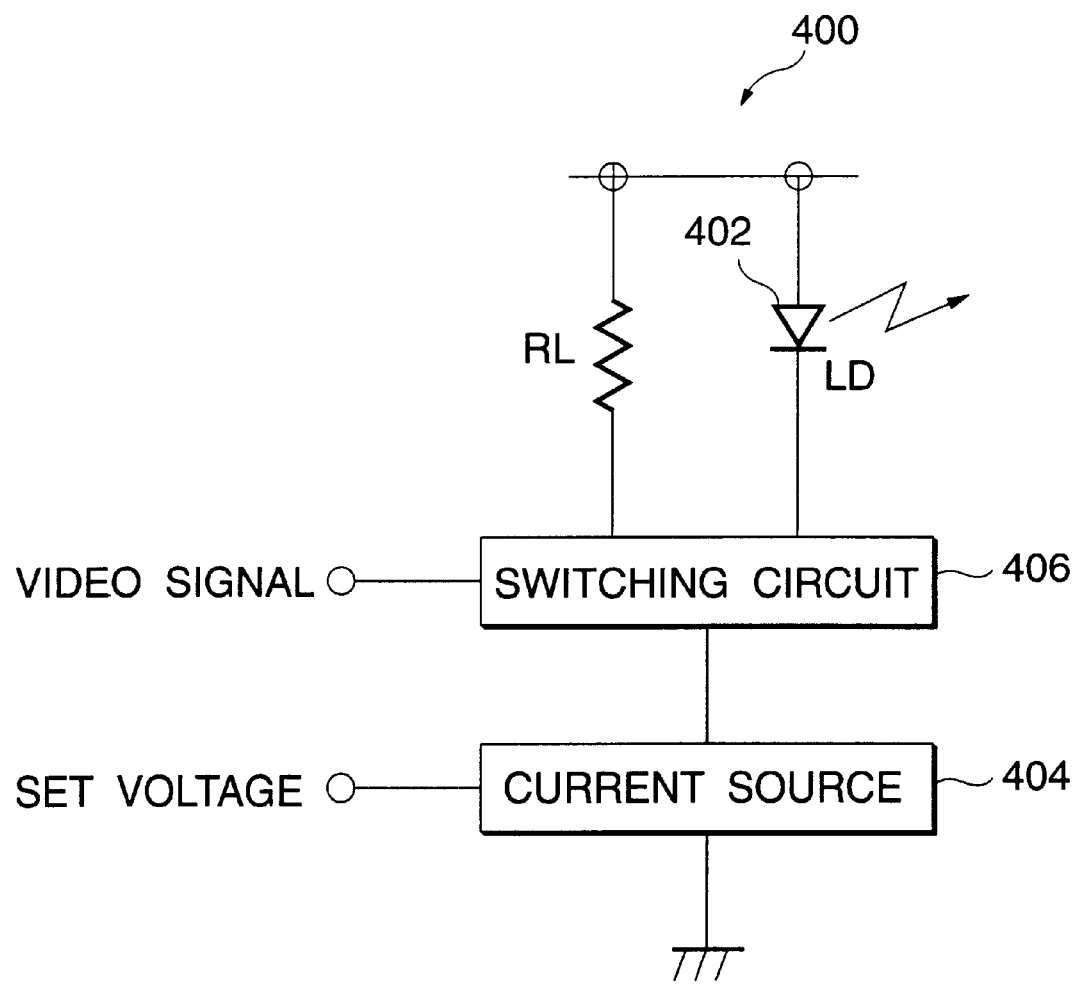
FIG. 13 is a diagram showing a general LD driving circuit used in an image forming apparatus.
Figure 14:
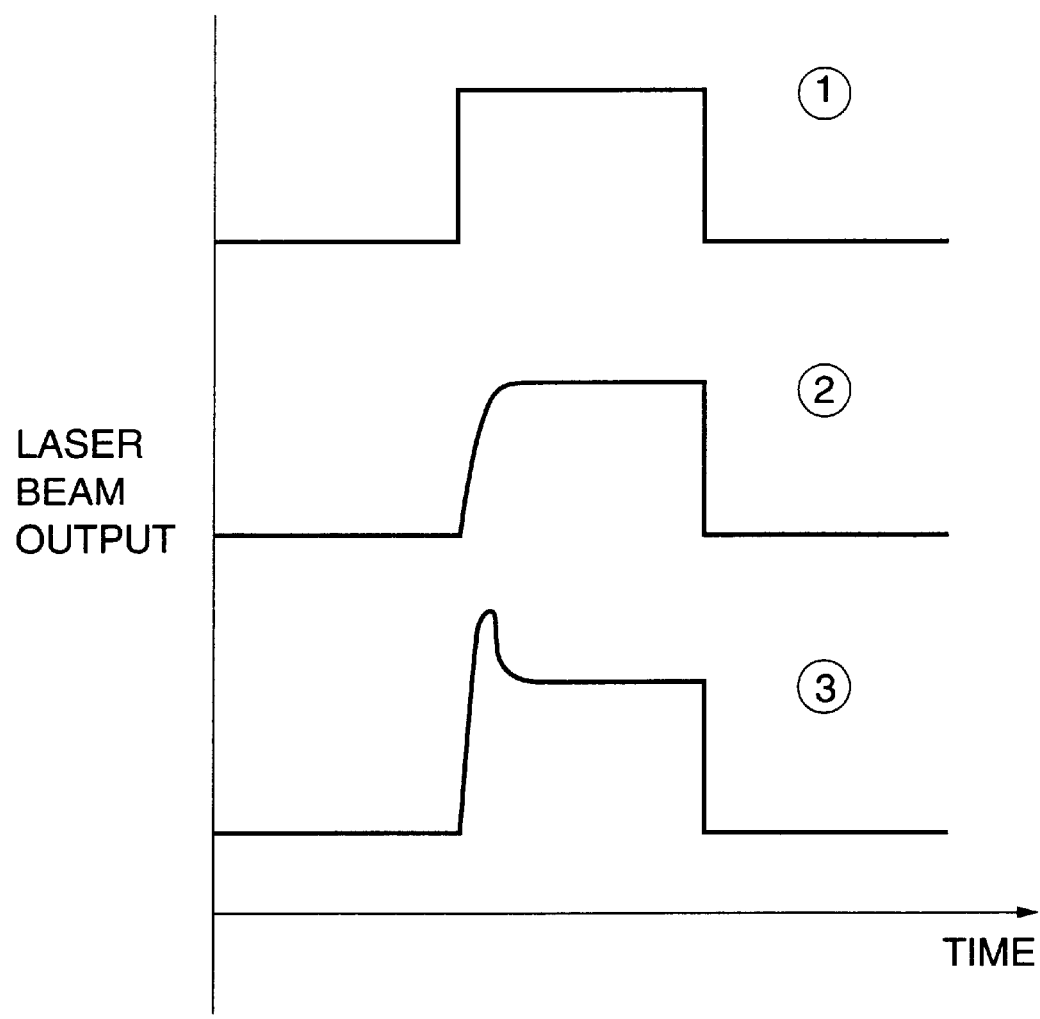
FIG. 14 is a diagram showing optical output waveforms formed during the modulation of a laser beam.
Figure 15:
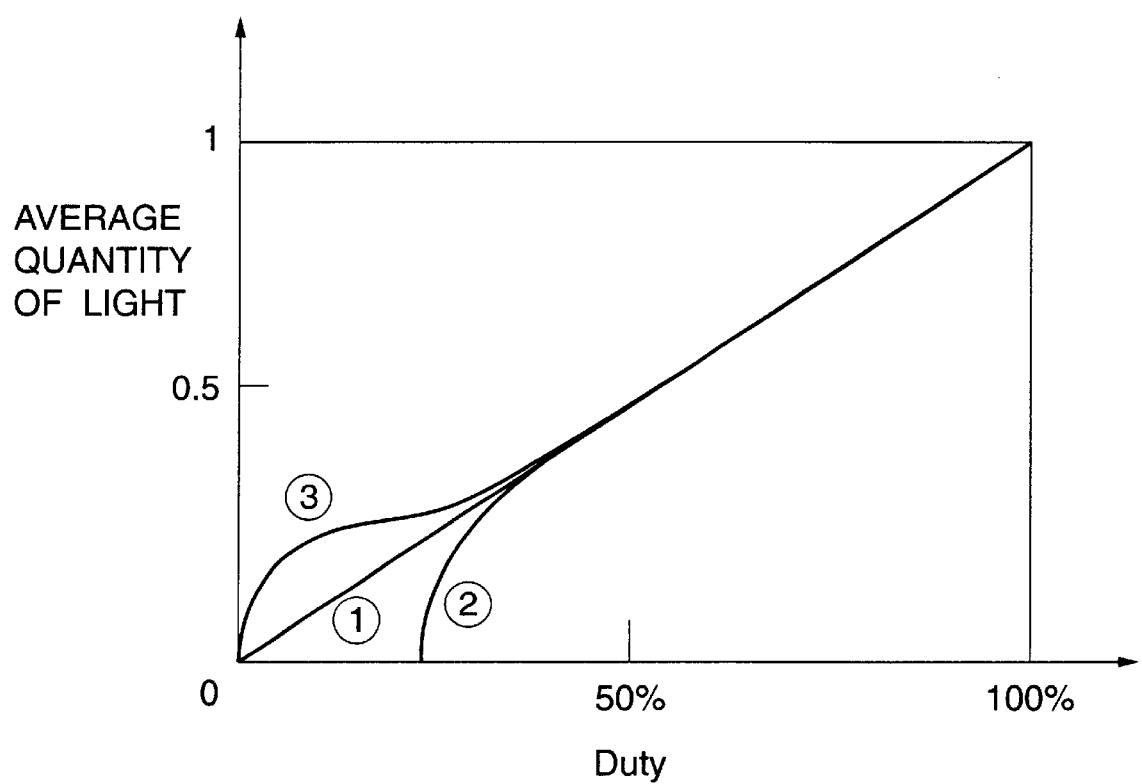
FIG. 15 is a diagram for describing a pulse width and an average quantity of light.

Namely, a bias current of a predetermined current value is supplied from the bias current source 70 to the LD 50. The level of this bias current is set lower than that of a threshold current (refer to FIG. 12) required by the LD 50 to output coherent light.

A load resistor (RL) 80 is connected to the power source terminal 78 in parallel with the LD 50. The LD 50 and load resistor 80 are connected to collectors of npn-type transistors 82, 84. The emitters of the transistors 82, 84 are all connected to the switching current source 72, and the bases thereof a switch 86. The switch 86 controls base currents of the transistors 82, 84, whereby ON/OFF of currents flowing from the collectors to the emitters is controlled.

To be exact, when the switch 86 is driven, a switching current flows from the collector of either one of the transistors 82, 84 to the relative emitter. Namely, supplying the switching current to the LD 50 and supplying the switching current to the load resistor 80 are rendered selectively interchangeable. When a switching current flows to the LD 50, a current the level of which is equal to the sum of those of the bias current and switching current flows to the LD 50.

The value of the switching current plus that of the bias current is set so as to exceed that of a threshold current required by the LD 50 to output coherent light. Namely, the lighting of the LD 50 is controlled by shifting the supplying of the switching current to the LD 50 and the supplying of the same to the load resistor 80 from one to the other.

The switch 86 is connected to a video terminal 88. The driving of the switch 86, i.e. the shifting of the supplying of the switching current to the LD 50 and the supplying of the same to the load resistor 80 from one to the other is done on the basis of a video signal from the video terminal 88. Consequently, a laser beam modulated on the basis of image data is generated. In this mode of embodiment, the modulation of the laser beam by a PWM system is carried out.

In a package of the LD 50, a photodiode (PD) 90 for monitoring the quantity of output light of the LD 50 is provided. The PD 90 outputs a current corresponding to the quantity of output light of the LD 50. This current is converted into a monitoring voltage by a current-voltage converter (not shown), and the resultant voltage is inputted into a positive terminal of a comparator 92.

A negative side of the comparator 92 is connected to a reference voltage terminal 94, from which a predetermined reference voltage is inputted thereinto. Namely, in the comparator 92, a monitoring voltage and a reference voltage are compared with each other, and the results are outputted therefrom.

An output terminal of the comparator 92 is connected to a S/H (Sample/Hold) circuit 96, which is connected to the switching current source 72. The S/H circuit 96 is adapted to vary a switching current (current value), which is set by the switching current source 72, on the basis of an output from the comparator 92, and generate a switching current which causes a monitoring voltage to agree with a reference voltage.

As previously described, the LD 50 is adapted to output coherent light when the level of a bias current exceeds that of a threshold current, and an output intensity (quantity of output light) therefrom has characteristics (refer to FIG. 12) proportional to the current (driving current) flowing in the LD 50. Therefore, the S/H circuit 96 can control the output of light of the LD 50 so as to output a laser beam of a predetermined optical intensity (quantity of light) set by a reference voltage, by changing the switching current so that the monitoring voltage agrees with the reference voltage.

The S/H circuit 96 is connected to a SH (Sample/Hold) terminal 98, from which a sample signal or a hold signal is inputted thereinto. The S/H circuit 96 is adapted to control the optical output from the LD 50 in a period in which a sample signal is inputted thereinto, and retain the results of the controlling of the optical output in a period other than the mentioned period, i.e., in a period in which a hold signal is inputted thereinto.

The sample signal is inputted into the S/H circuit in a period other than a period in which an image is written in accordance with a video signal, for example, in a period (which can be determined on the basis of SOS) in which an area other than an image area of the photosensitive body 22 is scanned with the laser beam, and a period prior to the starting of an image forming process. When an image is written in accordance with a video signal, the LD 50 is driven by the results of the controlling of an optical output from the LD 50 carried out while a sample signal is inputted into the S/H circuit, i.e., by a switching current set so that a monitoring voltage agrees with a reference voltage.

(Construction of RLC Circuit)

The RLC circuit 76 will now be described. As shown in FIG. 5, a coil 100 in the RLC circuit 76 is series-connected to the LD 50, while a resistor 102 and a capacitor 104 therein are parallel-connected to the LD 50. In this mode of embodiment, this RLC circuit 76 is used as an overshooting circuit.

In order to use such an RLC circuit 76 as an overshooting circuit, it is necessary as mentioned above to set a resistance value of the resistor 102, a capacitance of the capacitor 104 and an impedance of the coil 100 so that a solution of the response characteristics becomes a vibration solution (solution of an imaginary number). The characteristics (shape) of overshoot generated by the RLC circuit 76 are determined by these set values. Therefore, these values have to be set so that a desired shape of overshoot is attained. The setting of the resistance value of the resistor 102, capacitance of the capacitor 104 and impedance of the coil 100 will now be described.

In the description to be given below, the resistance value of the resistor 102, capacitance of the capacitor 104 and impedance of the coil 100 will be represented for the convenience' sake by R, C and L respectively in accordance with what is shown in FIG. 1. In the following description, a case where an image forming apparatus 10 is formed of an A4 laser printer; and a rotational speed of a photosensitive body 22 and resolution are 21 ppm and 1200 dpi respectively is taken as an example. In the case of the image forming apparatus 10 of such performance, a video frequency of a scanning exposure unit 32 is 70 MHz (14 nsec/pixel). When the optical designing is done by using a LD 50 of an oscillation frequency of 780 nm with a depth range in a scanning region secured to a certain extent, a beam diameter Dt in the fast scanning direction and a beam diameter in the slow scanning direction are about 60 μm and about 70 μm respectively. When the resolution is 1200 dpi, the interval (one dot size) is about 21 μm, which indicates that the laser beam diameter is about three times larger.

Figure 6:
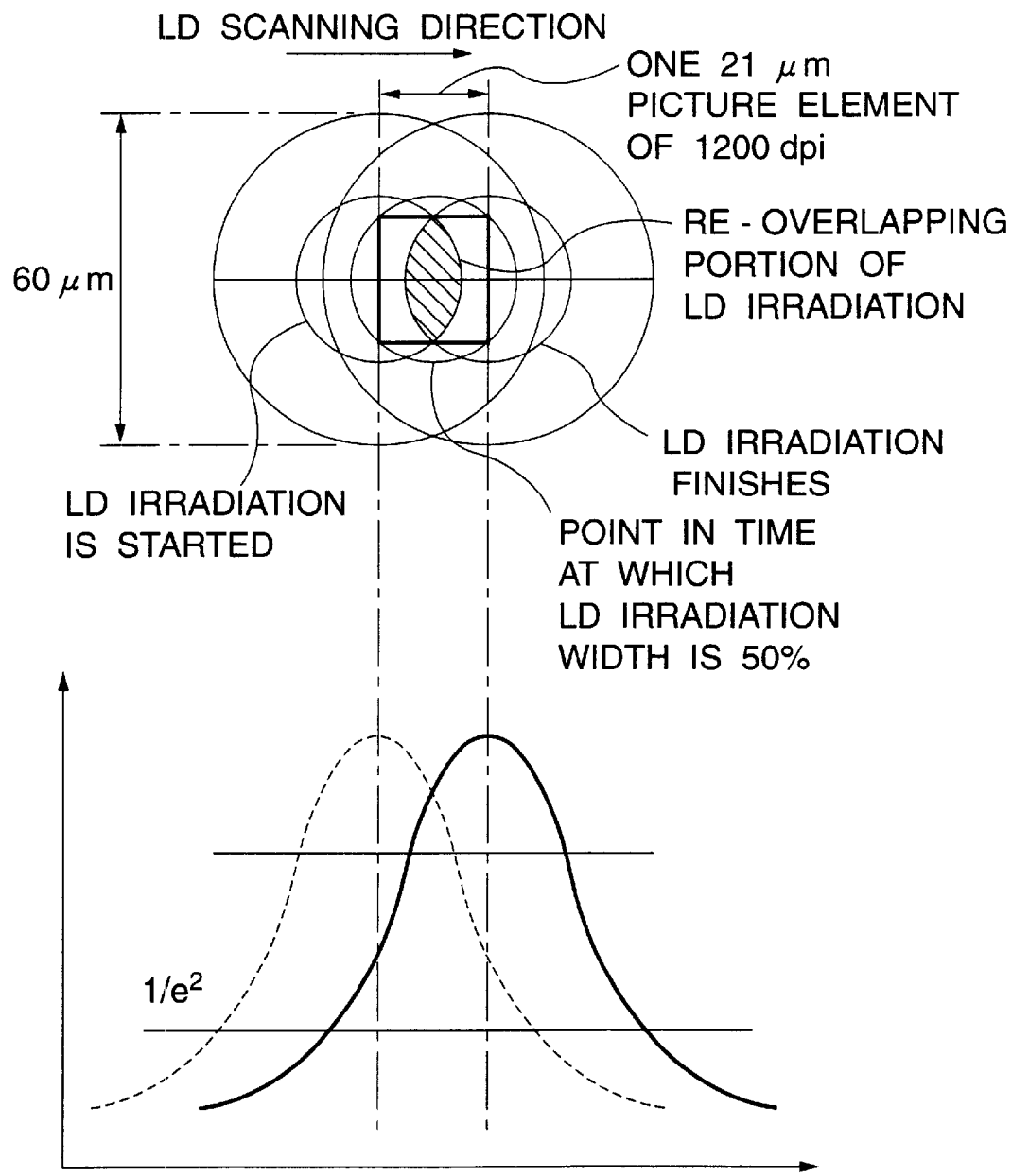
FIG. 6 is a conceptual diagram showing the principle of forming one dot by the image forming apparatus.

First, the shape of overshoot will be described. In order to form an image by scanning the photosensitive body with a laser beam in the image forming apparatus 10, the LD 50 is lit for a period of time corresponding to the time for 21 μm movement of the laser beam, whereby one pixel is formed. Namely, the LD 50 is turned off after the center of the laser beam has been moved 21 μm in the scanning direction with respect to one theoretical pixel as shown in FIG. 6.

Therefore, a re-overlapping portion which is always irradiated with the laser beam from a laser beam irradiation starting time to a laser beam irradiation finishing time exists on the photosensitive body 22. In this re-overlapping portion, the photoelectric effect is the highest, and positive charge occurs most, so that the latent image potential increases highest. In a developing device 38, a developing operation is carried out by a developing bias voltage as mentioned above with an arbitrary level of this latent image potential used as a threshold value. In a related art apparatus of this kind, the width of latent image potential of a laser beam re-overlapping portion formed on a photosensitive body 22 in a case where a one-dot (pixel) width line (which will hereinafter be referred to as "one-dot line") is scanned in the fast scanning direction and that of a laser beam re-overlapping portion formed thereon in a case where a one-dot line is scanned in the slow scanning direction differs definitely as shown in hatched portions of FIG. 7.

The relation between overshoot (ratio of current at the time of a peak of overshoot to a predetermined driving current) in a case where overshoot is generated at the irradiation starting time of the LD 50 and the latent image potential in central portions of one-dot lines in the fast and slow scanning directions is shown in FIG. 8.

As shown in FIG. 8, the latent image potential of a line in the fast scanning direction was at a substantially constant level of −175 V irrespective of current at the time of overshooting since the scanning operation was carried out with a laser beam sent out when a predetermined level of driving current flowed. Regarding the latent image potential of a line in the slow scanning direction, a level substantially equal to that of the latent image potential in the fast scanning direction was obtained when the latent image potential increased with an increase in overshoot so that the overshoot became about 1.4 times as high as the level of the predetermined driving current.

As mentioned above, the quantity of developing toner is determined depending upon the latent image potential. Therefore, it is desirable that the overshoot which permits an overshooting effect to be obtained, and which is in a practical range attainable by the existing circuit techniques, be set in the range of not smaller than about 1.1 times as high as a predetermined level of driving current and not larger than 1.7 times as high as the same. As is understood from FIG. 8, when the overshoot is around 1.4 times as high as the predetermined level of driving current, one-dot lines of a substantially equal width can be formed in the fast and slow scanning directions, so that the overshoot is more preferably set to around 1.4 times as high as the predetermined level of driving current.

As shown in FIG. 9, a width (time required for having the intensity at a rising edge of a laser beam converge on the predetermined level of driving current) of overshoot also exerts influence upon the width of one-dot line in the slow direction. For example, when overshoot is generated for all of the irradiation time for forming one dot, an elliptic dot elongated in the fast scanning direction as shown in a hatched portion of FIG. 9A is formed. Moreover, since the intensity of the laser beam increases, the latent image potential also increases, so that the resultant image becomes a large-dot non-preferable image.

On the other hand, when the width of overshoot is set to 60% of the irradiation time for forming one dot, the dot becomes smaller as shown a hatched portion of FIG. 9B. When the width of overshoot is set to about 35% of the mentioned irradiation time, a dot of a size substantially equal to an ideal size of 21 µm could be obtained as shown in a hatched portion of FIG. 9C. Namely, the width of overshoot is preferably not higher than 60% of the irradiation time for forming one dot, and more preferably around 35% thereof.

The setting of R, L, C for obtaining a shape of overshoot having overshoot of about 1.4 times and a width of overshoot of about 35% will now be described. When the conditions for the width of overshoot and overshoot mentioned above are substituted for the Equation (6) above, the braking coefficient k and resonance frequency T become:

$k=0.2, T=5$ nsec

When an attempt to determine the R, L, C in this case in the RLC circuit 76 of FIG. 5 is made in accordance with the Equation (6), concrete solutions are not obtained unconditionally because the Equation (6) has three (R, L, C) variables. Typical solutions are shown in Table 1.

TABLE 1

| Solution No. | R(Ω) | C(pF) | L(µH) |
| --- | --- | --- | --- |
| 1 | 2 | 995 | 0.0006 |
| 2 | 10 | 199 | 0.0032 |
| 3 | 100 | 19.9 | 0.0318 |
| 4 | 500 | 3.98 | 0.1592 |
| 5 | 1000 | 1.99 | 0.3185 |
| 6 | 1500 | 1.32 | 0.4777 |

Typical solutions obtained when the braking coefficient k and resonance frequency T are set to:

$k=0.1, T=5$ nsec are shown in Table 2.

TABLE 2

| Solution No. | R(Ω) | C(pF) | L(µH) |
| --- | --- | --- | --- |
| 7 | 1500 | 2.65 | 0.239 |
| 8 | 3000 | 1.33 | 0.477 |

Although many combinations of R, L, C for obtaining a desired shape of overshoot are theoretically conceivable as shown in Tables 1 and 2, the impedance characteristics of the LD driving circuit, impedance characteristics of a printed board, and impedence characteristics of the LD 50 itself exert influence upon the shape of overshoot in practice as mentioned above. Accordingly, it is necessary that the R, L, C of the RLC circuit 76 be set by selecting suitable solution among such solutions for attaining desired overshoot characteristics with consideration given to the impedance characteristics of the LD driving circuit, printed board and LD 50 itself.

To be exact, since the resistor 102 is parallel to the LD 50, the resistance value R may not be set to so low a level. Regarding the inductance L, the following should be noted. Although the components of a printed board are substantially constant when the art work is once determined, the inductance component (Lw) of the LD 50 scatters when its accuracy during the manufacturing thereof is at a certain level. There is the possibility that influence be exerted (refer to FIG. 2) on the overshoot characteristics due to the scatter of the inductance component. Therefore, the inductance L of the coil 100 should have a large value so as to hold down the influence of the inductance component of the LD 50. Similarly, the capacitance C of the capacitor 104 should have a large value so as to hold down the influence of the capacitance components Cd, Cp of the LD 50. In general, the inductance component of the LD is of nH order, and the capacitance components are around several pF.

When the above facts are taken into consideration, the solution of Solution No. 6 among the typical solutions on Table 1 can be judged suitable. Therefore, the R, C, L in the RCL circuit 76 in this mode of embodiment are set to R=1500 Ω, C=1.32 pF and L=0.4777 µH.

(Operation)

The operation of the mode of embodiment of the present invention will now be described. First, a flow of an image forming process carried out by the image forming apparatus 10 will be described.

When an instruction for forming an image is given in the image forming apparatus 10, the photosensitive body 22 is charged uniformly by the charging member 36, and scanned with and exposed to a laser beam, which is modulated by a PWM system, from the scanning exposure unit 32 on the basis of image data. Consequently, a latent image is formed on the photosensitive body 22. The latent image formed on the photosensitive body 22 is developed by a toner supplied by the developing member 38. The developed toner image is transferred to a sheet 16 by the transfer charger 24. The sheet 16 to which the toner image is transferred is subjected to a fixing process by the fixing device 34 to form an image, and the resultant sheet is discharged to the discharge tray 28.

The controlling of the driving of the LD 50 provided as a light source in the scanning exposure unit 32 will now be described. The controlling of the driving of the LD 50 is done by the LD driving circuit 54.

While the writing of an image in accordance with a video signal is not done, a sample signal is inputted into the LD driving circuit 54, and a switching current (current value) of the switching current source is set by the S/H circuit 96 so that a monitoring voltage and a reference voltage agree with each other. When the setting of the switching current finishes, the inputting of the sample signal is switched to that of a hold signal. This set value is retained while the writing of an image in accordance with the video signal is done. Consequently, an optical output from the LD 50 is set so as to have a predetermined optical intensity.

When the image writing is started, supplying a switching current to the LD 50 or to the load resistance 80 on the basis of the video signal is shifted selectively by the switch 86. When the switching current flows to the LD 50, the current flowing to the LD 50, i.e., a level of a driving current supplied to the LD 50 becomes equal to the sum of a value of a bias current and a switching current, and exceeds a value of a threshold current, so that the LD 50 is lit (laser beam is outputted).

Figure 10A:
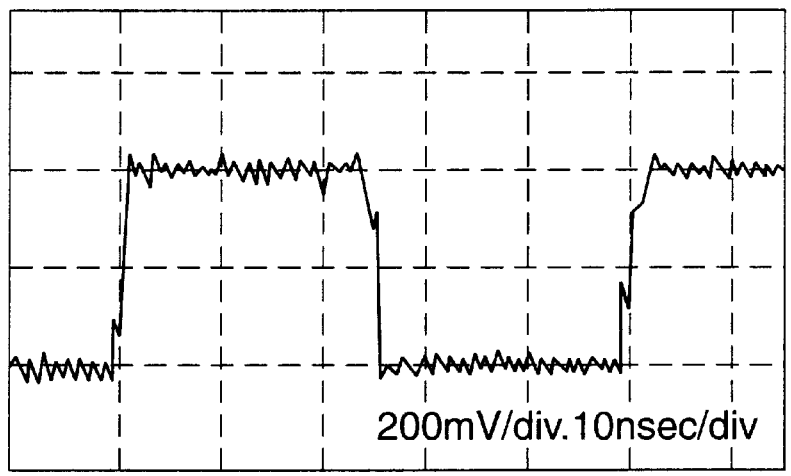
FIG. 10A shows an output waveform of LD driven by a related art LD driving circuit (not provided with an overshooting circuit)
Figure 10B:
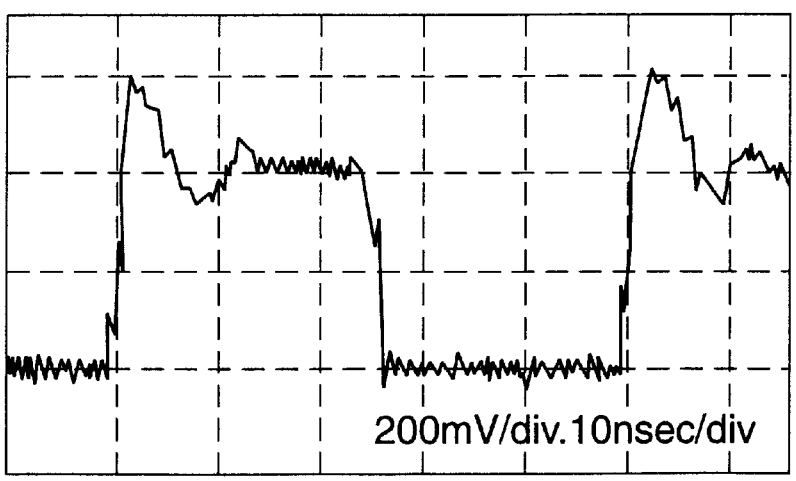
FIG. 10B shows an output waveform of LD driven by the LD driving circuit (provided with an overshooting circuit) of FIG. 5.

A lighting waveform obtained in a case where the LD 50 is turned on and off for every one pixel is shown in FIG. 10. FIG. 10A shows a lighting waveform obtained when the RLC circuit 76, i.e. an overshooting circuit is not used, and FIG. 10B shows a lighting waveform obtained when the RLC circuit 76, i.e. an overshooting circuit is used.

It is understood from FIG. 10 that using the RLC circuit 76 causes overshoot to occur. The overshoot is about 1.5 times, and the width of overshoot about 5 ns, so that a desired shape of overshoot is attained.

Therefore, in a transitional period immediately after the starting of the lighting of the LD 50, a transitional voltage having a predetermined shape (a predetermined width of overshoot and a predetermined overshoot with respect to the type) of overshoot is applied to the LD 50 due to the effect of the RLC circuit 76, and a current of a value larger than that obtained by summing up a bias current and a switching current flows in the LD 50. Namely, a driving current for the LD 50 increases for a while correspondingly to overshooting, and the optical intensity of the laser beam outputted from the LD 50 becomes higher than a predetermined level (which corresponds to a steady-state intensity of light in the present invention, and which will hereinafter be referred to as "steady-state intensity of driving light).

Consequently, the photosensitive body 22 is exposed (which will hereinafter be referred to as "overshooting exposure") to a laser beam the intensity of which is higher than the steady-state intensity of driving light, and the shortage of an exposure rate occurring in the position on the photosentive body 22 which is in the vicinity of the position in which the LD 50 starts being lit can be compensated, so that a deep latent image is formed on the photosensitive body 22. This causes the toner to be deposited sufficiently on the portion of the photosensitive body 22 which is in the vicinity of the position in which the LD 50 starts being lit. Therefore, the deterioration (decrease in the thickness of longitudinal lines) of the height to width ratio and the omission of image which occur in a case where the dot size is smaller than the diameter of the laser beam can be prevented (eliminated).

Figure 11A:
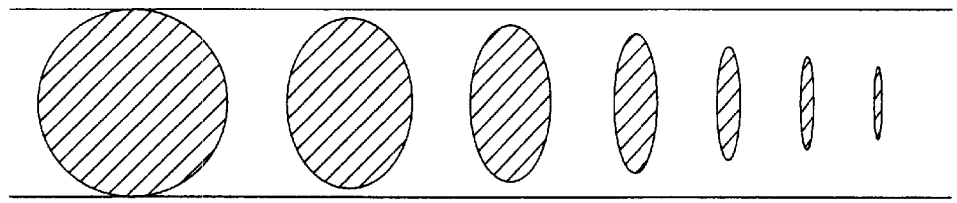
FIG. 11A shows a toner image obtained when LD is driven by the LD driving circuit (not provided with an overshooting circuit) of the related art.
Figure 11B:
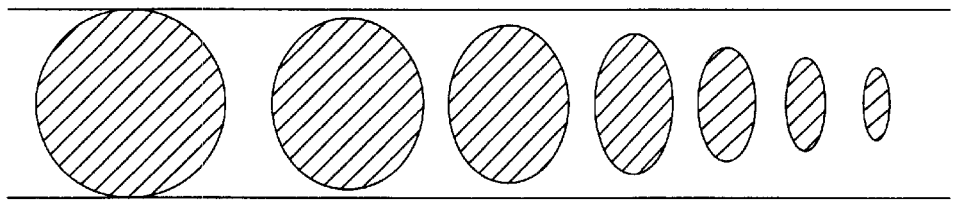
FIG. 11B shows a toner image obtained when LD is driven by the LD driving circuit (provided with an overshooting circuit) of FIG. 5.

FIG. 11 shows the relation between a lighting pulse width and a toner image practically developed. FIG. 11A shows a case where the RLC circuit 76, i.e. an overshooting circuit is not used, and FIG. 11B shows a case where the RLC circuit 76, i.e. an overshooting circuit is used.

A comparison between FIGS. 11A and 11B clearly shows that, when the lighting pulse width is reduced gradually in practice, using an overshooting circuit causes a higher reproducibility of one dot to be obtained, though the pulse width decreases. Since the deterioration of the height to width ratio in a case where the dot size is smaller than the diameter of a laser beam is prevented with the reproducibility of one dot improved, the reproducibility of a halftone is also attained.

A case where the resolution increases 1.5 times, i.e., to 1800 dpi under the same conditions will now be described. In this case, a video frequency becomes 158 MHz (6 nsec/pixel). When a braking coefficient k and a resonance frequency T are set to:

$$k=0,2, T=2 \text{ nsec}$$

respectively, typical solutions shown in Table 3 are obtained.

TABLE 3

| Solution No. | R(Ω) | C(pF) | L(μH) |
|---|---|---|---|
| 9 | 3000 | 0.265 | 0.382 |
| 10 | 4000 | 0.199 | 0.509 |

When the resolution is 1800 dpi, R, L, C of the RLC circuit 76 may be set to the values shown in Table 3. Namely, even when the resolution becomes higher, setting R, L, C in accordance with the resolution enables the same effects (refer to FIGS. 10 and 11) as in the case where the resolution is 1200 dpi to be obtained.

To put this description in order, when the exposure operation is carried out by increasing the optical intensity to a level higher than a steady-state level by utilizing the fact that the condition of a latent image to be formed differs with the rate of exposure of the photosensitive body, a latent image, the depth and width of which were always small according to the related art techniques, having a large depth and a large width can be formed. Therefore, when the optical intensity at the LD lighting starting time, i.e. the optical intensity at a rising edge of the laser beam is set higher than that thereof at the steady-state lighting time, the height to width ratio, and the reproducibility of one dot and halftone in a case where the resolution is smaller than the diameter of a laser beam can be improved.

When the characteristics of the overshooting circuit which are represented by a linear differential equation of at least second order and have a resonance solution are utilized, i.e., when the occurrence of overshoot in a transitional period is utilized at the LD lighting starting time, i.e., the optical intensity at a rising edge of a laser beam can be increased to a level higher than that thereof in a steady-state lighting time. The optical intensity at the LD lighting starting time, i.e. a rising edge of a laser beam can also be increased to a level higher than that thereof in a steady-state lighting time by other methods, for example, by providing plural LDs so as to increase the number of LDs to be lit for only a predetermined period of time after the LD lighting starting time, or by providing plural current sources for supplying a current to the LD so as to increase the number of current sources to be turned on for only a predetermined period of time after the LD lighting starting time.

Especially, the overshooting circuit can be attained by using an RLC circuit formed of a resistor, a coil and a capacitor, and it has a simple construction and does not require a special control unit. Therefore, the overshooting circuit can be obtained at a low price. The LD itself and LED substrate also have a resistance component, an inductance component and a capacitance component. When the initial characteristics of the LD and the mounting characteristics of the LD substrate based on these components are utilized, it becomes possible to omit one of the resistor, coil and capacitor of the RLC circuit.

The shape (amount of overshoot and width of overshoot) of overshoot is fixed by a braking coefficient k and a resonance cycle T, i.e. set values of R, L, C. Therefore, an optimum shape of overshoot can be obtained at all times by setting R, L, C in accordance with the resolution (writing density), a diameter of the laser beam and a writing speed. A high-quality image can be obtained, for example, by selecting the shape of overshoot so as to reduce the braking coefficient k when the resolution becomes high and so as to reduce the resonance cycle T when the writing speed becomes high, and in accordance with a height and width ratio of a diameter of the laser beam.

An electrophotographic image forming apparatus using a general laser beam spot, i.e. a laser beam spot (refer to FIG. 18C) having a diameter Dt in the fast scanning direction of about 60 μm and a diameter Ds in the slow scanning direction of about 70 μm with the braking coefficient k and resonance frequency T set concretely is described above but the present invention is not limited thereto.

The width of one-dot line in the fast scanning direction is necessarily determined by the diameter Ds in the fast scanning direction of a laser beam as shown in FIG. 7. Therefore, when the laser beam spot is set to a shape elongated in the fast scanning direction by increasing the diameter Dt in the fast scanning direction thereof and reducing the diameter Ds in the slow direction thereof, the deterioration (the diameter of a dot decreases in the fast scanning direction and increases in the slow scanning direction as shown in FIG. 11) of the shape of a dot occurring when the pulse lighting width is reduced gradually, i.e., when an image of a high resolution is formed can be prevented.

To be exact, a laser beam spot set so that Dt/Ds (which will hereinafter be referred to as "aspect ratio") becomes substantially 1.25 was used in the above-described image forming apparatus, an ideal one-dot size and one-dot line of 1200 dpi could be formed as shown in FIG. 9D. When the width of overshoot is regulated in accordance with this aspect ratio, a dot of a nearly circular shape can be formed. In order to reproduce one dot with a higher resolution, for example, resolution of not lower than 1800 dpi, using a laser beam spot of a higher aspect ratio is advantageous as a matter of course. Namely, an aspect ratio of not lower than 1.25 is required. A method may be employed of setting desired braking coefficient k and resonance frequency T in accordance with the diameters in the fast and slow scanning directions of the laser beam, and determining R, L, C corresponding to the set braking coefficient k and resonance frequency T.

It is known that the condition of a latent image formed on a photosensitive body differs with the operational environmental conditions, which include temperature and humidity, of an image forming apparatus. To correct such conditions, a device (thermistor) for detecting the operational environment may be provided, and the quantity of steady-state driving light may be varied on the basis of the results of the detection carried out by the detecting device. This can be attained, for example, by changing a reference voltage in accordance with the ambient temperature. In this case, an absolute value of the quantity of light at the overshooting time varies with the variation of the quantity of steady-state driving light but a ratio of this absolute value to the quantity of steady-state driving light is constant.

In an image forming apparatus having a resolution switching function capable of selecting plural resolutions, optimized elements out of plural elements constituting an RLC circuit may be set selectable when the switching of resolution is done, for the purpose of maintaining the quality of an image with respect to each resolution at an optimum level. The present invention can, of course, be applied to an image forming apparatus adapted to form color images.

As described above, the present invention is capable of forming a high-quality image with resolution so high as to permit a dot size to be set smaller than the diameter of a laser beam in use, and providing at a low cost an image forming apparatus operable to obtain such an image.

What is claimed is:

1. A scanning exposure unit that turns on a semiconductor laser on the basis of image information, and subjects a photosensitive body to scanning exposure with a laser beam outputted form the semiconductor laser, comprising:

a device for increasing an optical intensity at a rising edge of the laser beam to a level higher than that of a steady-state optical intensity thereof every time the laser is turned on, wherein output of the device is optimized by setting values of at least one circuitry component of the device on the basis of at least one of a wiring density, a wiring speed, and diameters of the laser beam in fast and slow scanning directions.

2. A scanning exposure unit according to claim 1, wherein the optical intensity at the rising edge of the laser beam is increased by generating overshoot in an optical output from the semiconductor laser.

3. A semiconductor laser driving circuit that controls driving of a semiconductor laser used as a light source when an outer surface of a photosensitive body is subjected to scanning exposure with a laser beam, comprising:

an optical output control circuit that generates overshoot by increasing a level of an output from the semiconductor laser to a level higher than that of a steady-state optical output, and controls the output at a semiconductor laser lighting starting time, wherein the overshoot is optimized by setting values of at least one component of the optical output control circuit on the basis of at least one of a wiring density, a wiring speed, and diameters of the laser beam in fast and slow scanning directions.

4. A semiconductor laser driving circuit according to claim 3, wherein the optical output control circuit includes at least one of a resistor, an inductor and a capacitor, and is represented by a linear differential equation of at least second order.

5. An image forming apparatus comprising:

a scanning exposure unit that turns on a semiconductor laser by a semiconductor laser driving circuit on the basis of image information, and subjects a photosensitive body to scanning exposure with a laser beam outputted from the semiconductor laser having an optical intensity at a rising edge thereof at each laser lighting time higher than a steady-state optical intensity thereof, wherein the optical intensity at the rising edge is optimized based upon at least one of a wiring density, a wiring speed, and diameters of the laser beam in fast and slow scanning directions.

6. An image forming apparatus according to claim 5, wherein the optical intensity at a rising edge of the laser beam converges at not higher than 60% of irradiation time for forming one pixel, preferably at substantially 35% thereof, and a maximum value of the optical intensity is not smaller than 1.1 times and not larger than 1.7 times a steady-state optical intensity, and preferably substantially 1.4 times.

7. An image forming apparatus according to claim 5, wherein the laser beam is focused as a beam spot on the photosensitive body by an imaging member, an outer surface of the photosensitive body is scanned relatively with the beam to form an electrostatic image thereon, and a diameter of the beam spot in the fast scanning direction is larger than that in the slow scanning direction orthogonal to the fast scanning direction.

8. An image forming apparatus according to claim 7, wherein the diameter of the beam spot in the fast scanning direction is not smaller than 1.25 times as large as that in the slow scanning direction.

9. An image forming apparatus according to claim 5, further comprising:

an environmental information obtaining member that obtains environmental information including at least one of temperature and humidity; and a steady-state optical intensity control member that changes the steady-state optical intensity on the basis of the environmental information obtained by the environmental information obtaining member.

10. An image forming apparatus comprising:

an exposure member that forms an electrostatic latent image on a photosensitive body with a laser beam;

a developing member that electrostatically develops the electrostatic latent image with a toner and forms a toner image on the photosensitive body; and a transfer member that transfers and forms the toner image on a transfer medium, wherein the exposure member comprises an optical output control member that sets an optical intensity at a rising edge of the laser beam to a level higher than that of a steady-state optical intensity thereof at each laser beam lighting time during the formation of the electrostatic latent image, and the optical intensity at the rising edge is optimized based upon at least one of a wiring density, a wiring speed, and diameters of the laser beam in fast and slow scanning directions.

* * * * *